United States Patent
Pietkiewicz

(10) Patent No.: US 8,890,642 B2
(45) Date of Patent: *Nov. 18, 2014

(54) INTEGRATED MAGNETIC DEVICE FOR LOW HARMONICS THREE-PHASE FRONT-END

(71) Applicant: Schaffner EMV AG, Luterbach (CH)

(72) Inventor: Andrzej Pietkiewicz, Burgdorf (CH)

(73) Assignee: Schaffner EMV AG, Luterbach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/667,879

(22) Filed: Nov. 2, 2012

(65) Prior Publication Data

US 2013/0121050 A1    May 16, 2013

Related U.S. Application Data

(63) Continuation of application No. PCT/EP2010/058669, filed on Jun. 18, 2010.

(30) Foreign Application Priority Data

Jun. 10, 2010   (WO) ................. PCT/EP2010/058157

(51) Int. Cl.
| | |
|---|---|
| *H01F 30/12* | (2006.01) |
| *H01F 21/02* | (2006.01) |
| *H01F 27/28* | (2006.01) |
| *H01F 37/00* | (2006.01) |
| *H02M 1/12* | (2006.01) |
| *H02M 7/06* | (2006.01) |
| *H01F 27/33* | (2006.01) |
| *H01F 38/02* | (2006.01) |
| *H02M 7/217* | (2006.01) |
| *H02M 7/493* | (2007.01) |

(52) U.S. Cl.
CPC ............... *H01F 37/00* (2013.01); *H02M 1/126* (2013.01); *H02M 7/06* (2013.01); *H01F 27/33* (2013.01); *H02M 1/12* (2013.01); *H01F 30/12* (2013.01); *H01F 2038/026* (2013.01); *H02M 7/2173* (2013.01); *H02M 7/493* (2013.01)
USPC .................................. 336/5; 336/15; 336/170

(58) Field of Classification Search
CPC ......... H01F 30/12; H01F 30/14; H01F 27/00; H01F 27/306; H01F 27/2847; H01F 27/28; H01F 27/38; H01F 30/06; H01F 3/14
USPC ................................................ 336/5, 15, 170
See application file for complete search history.

(56) References Cited

U.S. PATENT DOCUMENTS

| | | | |
|---|---|---|---|
| 5,124,904 A | 6/1992 | Paice | |
| 5,202,664 A * | 4/1993 | Poulsen | ............................ 336/5 |

(Continued)

FOREIGN PATENT DOCUMENTS

| | | |
|---|---|---|
| EP | 1385258 A1 | 1/2004 |
| EP | 2068430 A2 | 6/2009 |

(Continued)

*Primary Examiner* — Elvin G Enad
*Assistant Examiner* — Kazi Hossain
(74) *Attorney, Agent, or Firm* — Blank Rome LLP

(57) ABSTRACT

An integrated magnetic for a low harmonics three-phase bidirectional front-end and also for AC/DC and DC/AC power converters. Its use enables reduction of the harmonics of the currents absorbed or injected to three-phase power line by using only one device which integrates a splitter and an inductor function. Compared to known solutions, cost, material and dimensions of the integrated magnetic device are reduced thanks to the magnetic core comprising three closed sub-assemblies and one or more jokes, separated by air-gaps from the sub-assemblies.

17 Claims, 22 Drawing Sheets

(56) References Cited

U.S. PATENT DOCUMENTS

| | | | |
|---|---|---|---|
| 5,379,207 A * | 1/1995 | Shah | 363/64 |
| 7,005,840 B2 | 2/2006 | Cester | |
| 7,902,956 B2 | 3/2011 | Sodo | |
| 2005/0077886 A1 | 4/2005 | Cester | |
| 2009/0140829 A1 | 6/2009 | Sodo | |
| 2013/0141200 A1* | 6/2013 | Pietkiewicz | 336/5 |
| 2013/0219700 A1* | 8/2013 | Hurst et al. | 29/605 |

FOREIGN PATENT DOCUMENTS

| | | |
|---|---|---|
| GB | 506280 | 2/1937 |
| JP | 2000358372 A | 12/2000 |
| JP | 2007028846 A | 2/2007 |
| WO | WO-9819385 A1 | 5/1998 |

* cited by examiner

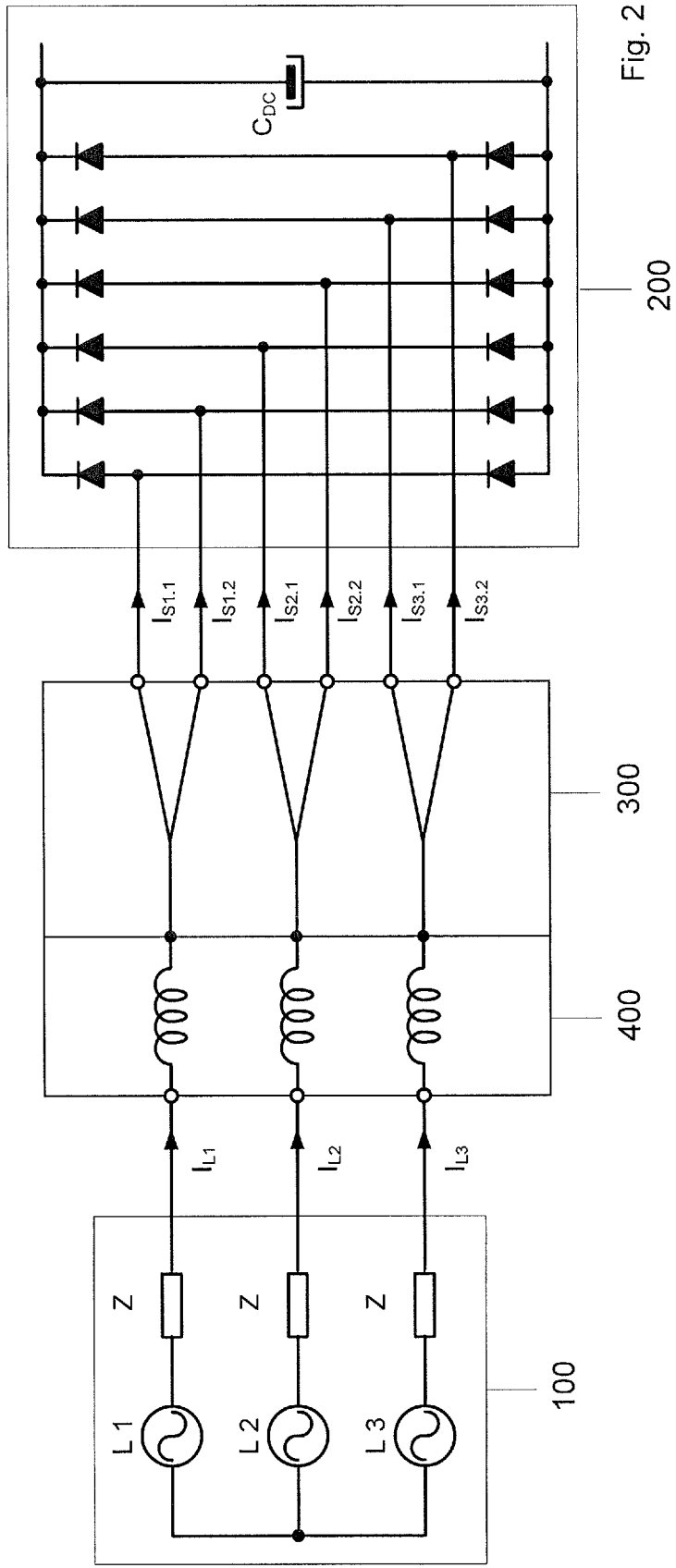

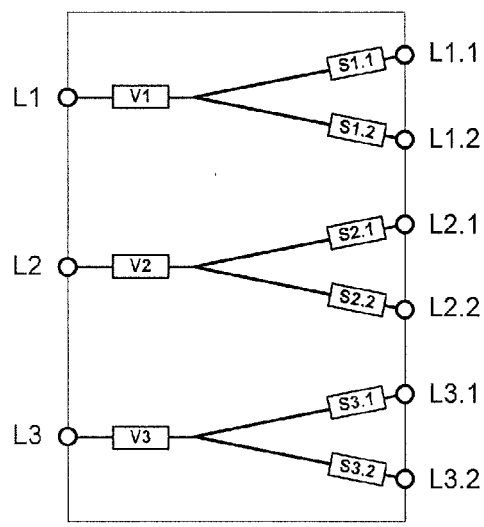
Fig. 18A
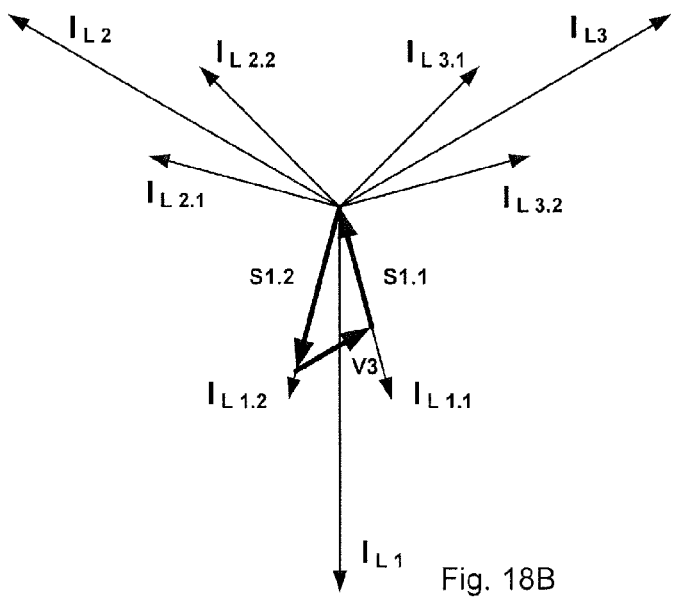
Fig. 18B
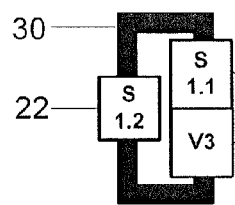 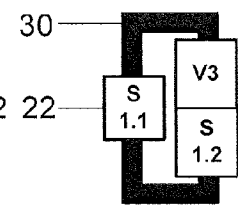 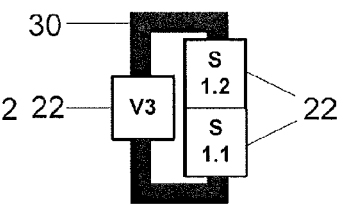
Fig. 18C  Fig. 18D  Fig. 18E

INTEGRATED MAGNETIC DEVICE FOR LOW HARMONICS THREE-PHASE FRONT-END

REFERENCE DATA

This application is a continuation of International Patent Application PCT/EP2010/ 058669 (WO 2011154058) filed on Jun. 18, 2010, claiming convention priority of international patent application PCT/EP2010/058157 of Jun. 10, 2010, the contents whereof are hereby incorporated by reference.

FIELD OF THE INVENTION

Embodiments of the present invention concern an integrated magnetic device for low harmonics three-phase front-end, which can be unidirectional or bidirectional, and a bidirectional low harmonics three-phase front-end power converter including such device.

DESCRIPTION OF PRIOR ART

The widespread use of power electronic equipment has increased the need of minimization of power lines harmonic pollution. Main source of current harmonics are non-linear power loads. An important non-linear power load is the six-pulse rectifier, which is widely used as a front-end solution for the majority of the three-phase equipments.

If there is not an efficient minimization of the current harmonics, some problems can occur. First, harmonics can destroy the quality of public power supply voltage and a low quality of the supply voltage causes malfunction and/or failure of many different kinds of electrical equipment supplied by the public power grid.

Moreover harmonics can cause excessive losses in the components of the power grid such as transformers, power lines, etc. Further, harmonics have audible frequencies: if the power line polluted by harmonics is in the vicinity of an audible equipment installation, an audible distortion can be induced.

Different solutions have been used in the prior art to cope with the harmonics' problem. Multi-pulse rectifiers, i.e. a 12-pulse, are widely used as a simple interface with improved current waveforms. They reduce the harmonic currents and are very reliable but have some disadvantages: first they require a bulky and expensive line-frequency input power transformer to create galvanic isolation; moreover they are sensitive to voltage unbalance.

The use of a 6-pulse rectifier with a harmonic filter suppressing harmonics is also known. The harmonic filter can be passive or active. Passive filters have low power losses but are costly and have a big size and a big weight. Active filters are regarded as less reliable, have higher power losses and switching distortions and are quite expensive.

Another known solution is the active front-end, comprising controlled active switches, diodes and high frequency line reactors. Even if its size and weight can be attractive and its cost can be lower than other solutions, it presents some disadvantages, in particular it is perceived as less reliable, and it is difficult to match power losses and switching distortion of a passive system.

Another known solution of the state of the art and shown on the example of FIG. 1A comprises an inductor 400 followed by a three interconnected magnetic devices 300. The inductor 400 is preceded by a three-phase power line or grid 100 and the devices 300 are connected to a load 200. In general the part between a 12 or more pulse rectifier and a generic DC load, which can be a motor drive, for example a converter DC/AC or DC/DC, or a generic resistor will be named in the following as the DC link. A DC link can include a capacitor or an inductor. The load 200 shown in FIG. 1A is composed by a 12-pulse rectifier, a DC link—in this case the capacitor $C_{DC}$—and a generic load not illustrated.

The load 200 of FIG. 1A is non linear and then harmonics are present in the power line. To cope with the harmonics' problem, the inductor 400 and the three magnetic devices 300 are used: the main function of the inductor 400 is delaying currents respect to the voltage phasors of the three-phase power line 100; the main function of three magnetic devices 300 is splitting currents.

In FIG. 1A the devices 300 comprise nine windings, three for each magnetic device, that are electrically and magnetically connected each other. A different number and combination of windings are possible.

A top view respectively a side view of the three-phase inductor 400 are illustrated in FIGS. 1B and 1C: it comprises two yokes 405, three wound limbs 403 and air-gaps 402, it can therefore store energy.

Top and side view of the three magnetic devices 300 of the state of the art are illustrated in FIGS. 1D and 1E. Each device 300A, 300B and 300C does not contain air-gaps and comprises three vertical limbs: the central limb is a wound limb containing windings 302.

JP2000358372A and JP2007028846A describe a system allowing the elimination of the transformer and a method for reducing size and weight by using four magnetic devices as shown in FIGS. 1B to 1E.

The total number of magnetic devices used in a converter of the state of the art as illustrated in FIG. 1A is then at least four, i.e. the three-phase inductors 400 plus the three magnetic devices 300.

As shown in FIG. 2, the inductor 400 comprises three current inputs, connectable to a three phase power grid or power line 100, and the devices 300, following the inductor 400, comprise six current outputs, i.e. two current outputs for each current input. In one embodiment there are more than two current outputs for each current input, so that the number of current outputs can be nine, twelve, etc. The current outputs are galvanically connected to the three current inputs and connectable to a load 200. In this case there is not a galvanic isolation between current inputs and outputs as in the case of a transformer.

The three-phase electric power grid 100 supplies three approximately sinusoidal voltages with 120° phase shift. The phase shift between the three input currents $I_{L1}, I_{L2}, I_{L3}$ flowing in the three current inputs is then equal to 120° as illustrated in FIG. 3A. The amplitude and the frequency of the line voltages will vary according among others to local regulations, but the frequency will be equal, in most applications, to 50 Hz or 60 Hz, and the voltage is usually comprised between 100 V and 1 kV, for example 400 V rms between phases. The frequency of 50 Hz or 60 Hz or the frequency of the power grid 100 will be referred to in the following as the fundamental frequency of the system.

Each of the currents flowing in the three current inputs and having the reference $I_{L1}$ or $I_{L2}$ or $I_{L3}$ will be named in the following as the common current. If the inductor 400 is not present in the converter of FIG. 2, the three common currents $I_{L1}, I_{L2}, I_{L3}$ are in phase with the voltage phasors of the power grid 100.

When the devices 300 are connected between the three phase power grid 100 and the load 200, they split each of the common currents $I_{L1}, I_{L2}, I_{L3}$ into two or more currents flowing in each current outputs. In the case shown in FIG. 2, they split each of the current $I_{L1}$, $I_{L2}$, $I_{L3}$ into two currents: the common current $I_{L1}$ is split into the two split currents $I_{S1.1}$, $I_{S1.2}$, the common current $I_{L2}$ is split into the two split currents $I_{S2.1}$, $I_{S2.2}$, and the common current $I_{L3}$ is split into the two split currents $I_{S3.1}$, $I_{S3.2}$. The currents $I_{S1.1}$, $I_{S1.2}$, $I_{S2.1}$, $I_{S2.2}$, $I_{S3.1}$, $I_{S3.2}$ flowing in the current outputs have all the same amplitude and are phase shifted of a predetermined angle $\phi/2$ respect to the corresponding fundamental components flowing in the current input.

The value of the angle $\phi$ is for example 30° so that the phase shift between the two split currents, for example $I_{S1.1}$, $I_{S1.2}$, and the corresponding common current, in this case $I_{L1}$, is respectively of 15° and −15°.

As discussed, a common current, for example $I_{L1}$, is split into two split currents: a first split current $I_{S1.1}$, which will be called in the following leading split current, and a second split current $I_{S1.2}$, which will be called in the following lagging split current. In the other and $I_{S1.1}$, $I_{S2.1}$ and $I_{S3.1}$ are leading split currents and $I_{S1.2}$, $I_{S2.2}$ and $I_{S3.2}$ are lagging split currents.

If the value of the angle $\phi$ is 30° as mentioned, the length of the phasors of the FIG. 3B, which is the same for all represented phasors, is 51.76% of the length of each phasor of FIG. 3A.

The presence of the three-phase inductor 400 before the devices 300 causes a lagging angle or phase shift angle δ shown in FIG. 3A between each of the voltage phasors of the power grid 100, represented by dashed lines, and the corresponding input currents $I_{L1}$, $I_{L2}$, $I_{L3}$. As shown in FIG. 3B, the lagging angle or phase shift angle δ is still present in the phasor diagram of the output currents.

As mentioned, in many practical realizations the load 200 to which devices 300 are connected is composed by a 12-pulse rectifier followed by a DC link and a generic DC load.

In a system comprising a three-phase power line 100, devices 300, a 12-pulse rectifier and a DC link, an inductor or a choke can be used to have a continuous-conduction mode or CCM. Continuous-conduction mode (CCM) means that the rectifier current never goes to zero during period of the power line. On the contrary, in discontinuous-conduction-mode (DCM) the current can go to zero during part of the period of the power line. In the discussed examples, the CCM is ensured by the three-phase inductor 400.

The solutions described in the prior art are then not optimised for reducing the cost and the size of a low harmonics three-phase front-end.

Moreover the functions of delaying and splitting currents are performed by four separated devices, respectively the inductor 400 and the three magnetic devices 300.

A solution allowing a low harmonic power converter having lower cost and lower size than the prior art is needed.

A magnetic device for 12-pulse front-end allowing high efficiency and high reliability is needed.

A solution allowing a low harmonics three-phase front-end not sensitive to the imbalance of the power grid is needed.

A low harmonics three-phase front-end having low failure rate, low power losses and low switching distortion is also needed.

BRIEF SUMMARY OF THE INVENTION

The aim of the present invention is to provide an integrated magnetic device performing the functions of the inductor 400 and of the three magnetic devices 300. The adjective integrated means in fact that the magnetic device of the invention performs more than one function. In particular the functions of delaying and splitting currents are both performed by the same magnetic device, allowing a lower size, weight, cost and better symmetry of the device than the prior art.

Another object of the present invention is to provide a low harmonics three-phase bidirectional front-end power converter comprising a simple semiconductor circuitry.

Another object of the present invention is to provide a magnetic device reliable and efficient.

According to the invention, these aims are achieved by means of a integrated magnetic device for low harmonics three-phase front-end according to claim 1, by means of a use of this integrated magnetic device in a AC/DC rectifier (claim 15) and in a DC/AC inverter (claim 16) and by means of a low harmonics bidirectional three-phase front-end power converter according to claim 17.

The device according to the invention comprises three magnetic sub-assemblies, wherein each magnetic sub-assembly comprises a close magnetic loop without air-gaps, two wound limbs and at least three windings. In one embodiment each magnetic sub-assembly comprises four windings. The device comprises at least one first common yoke and at least one second common yoke which magnetically connect the three magnetic sub-assemblies. In a preferred embodiment the two common yokes are identical and juxtaposed on the top respectively on the bottom of the three magnetic sub-assemblies.

Advantageously the device comprises at least one air-gap between the three magnetic sub-assemblies and one of the two common yokes. In a preferred embodiment it comprises two air-gaps, i.e. a first and a second air-gaps respectively between the top and the bottom of the three magnetic sub-assemblies and the first respectively second common yokes.

The device has three current inputs connectable to a three phase power line or grid and at least two current outputs for each current input. In a preferred embodiment the device has six current outputs, i.e. two current outputs for each current input. The current outputs are galvanically connected to the three current inputs and can be connected to a load.

Each of the three magnetic sub-assemblies comprises a first yoke and a second yoke which constitute together with the two wound limbs a close magnetic loop without air-gaps. Each of the three magnetic sub-assemblies can comprise moreover two bobbins assembled on this close magnetic loop, in particular placed on two limbs. In one embodiment the three magnetic sub-assemblies have identical limbs. In another embodiment the cross-section of each limb can be selected as needed, depending for example of the magnetic flux flowing inside each limb.

Advantageously the net sum of the magnetic fluxes at the fundamental frequency entering into the first or second common yokes is zero.

When said device is connected between the three phase power grid and the load, the fundamental components of the currents flowing in each of the current outputs are phase shifted of a predetermined angle respect to the corresponding fundamental component of the current flowing in the current input. The angle's value depends on the pulse-rectifier that can be connected to this device.

In a first embodiment the device comprises one first common yoke and one second common yoke having a rectangular shape. In this case the three magnetic sub-assemblies are aligned.

In another embodiment the device comprises two first common yokes and two second common yokes having a rectangular shape. In this embodiment the magnetic device comprises two holes which can be used for cooling it by air flowing.

In another embodiment the device comprises one first and one second common yokes having a triangular or circular or polygonal shape. In these cases the three magnetic sub-assemblies are disposed respectively in a triangular or circular or polygonal manner and the device comprises a central hole. An air flow can advantageously pass through this hole and efficiently cools the device. This embodiment is easy to produce and has a better symmetry than the previous embodiments, i.e. it is characterised by identical parameters for all the three phases.

Advantageously the three magnetic sub-assemblies can be made by using interleaved UI laminations. These cores are then easy to manufacture.

If the device of the invention is connected between the three phase power grid 100 and a load 200, the fundamental components of the split current flowing in each of the at least two current outputs are phase shifted of a predetermined angle respect to the fundamental component of the common current flowing in the current input. As discussed, a typical value of this angle for 12-pulse front-end is 30°.

Some energy is stored in a magnetic field inside the air-gaps. In such a case a lagging angle or phase shift angle δ between each of the voltage phasors of the power grid 100 and the corresponding input currents $I_{L1}$ or $I_{L2}$ or $I_{L3}$ of the magnetic device can be observed as shown in FIG. 3A. In this case the inductor function is integrated in the same device. Moreover it is easy to control the value of the inductance of this device by changing the thickness of the air-gap, which in one embodiment is in the order of magnitude of a few mm.

Advantageously the magnetic device of the invention can be used both in AC/DC or in DC/AC converters. If it is used in an AC/DC converter, for example in combination with a 12-pulse rectifier, the current flow goes from the current inputs or common paths of the device to its current outputs or split paths. In this case the device works as a current splitter: the common current in the common path is forced to split into two identical but phase shifted split currents in the split paths. In one embodiment the common current is forced to split into more than two identical but phase shifted split currents.

If the device is used in a DC/AC converter, the current flow goes from the two split paths to the common path. In this case the device works as a current merger. In both cases the action of the device reduces the harmonic currents. In an AC/DC or in a DC/AC converter comprising this magnetic device a galvanic isolation is not possible.

Advantages of the solution as compared with the prior art include in particular the possibility to use a single device performing the function of an inductor plus the function of a splitter with three magnetic cores of the state of the art both in high and low impedance DC link rectifiers. The device comprises one magnetic device, instead of the four magnetic devices of the state of the art solution (three devices 300 and one device for the inductor 400). This magnetic device is constituted by the three magnetic sub-assemblies and by the two common yokes, which are magnetically connected.

The solution further reduces the size, the weight and the cost of a low harmonic power converter and allows high reliability and efficiency and low EMI (electro-magnetic interference). Moreover it allows a lot of possible arrangements for the windings of the magnetic sub-assemblies' wound limbs.

The solution eliminates some important harmonics like known multi-phase rectifiers but it is not sensitive to the voltage unbalance of the power grid.

BRIEF DESCRIPTION OF THE DRAWINGS

The invention will be better understood with the aid of the description of an embodiment given by way of example and illustrated by the figures, in which:

FIG. 2 shows a general block diagram of a three-phase inductor and a splitter device with three magnetic devices of the state of the art, connected between a three-phase power line and a load comprising a 12-pulse rectifier.

DETAILED DESCRIPTION OF POSSIBLE EMBODIMENTS OF THE INVENTION

The integrated magnetic device of the invention is designed for a low harmonics three-phase front-end, unidirectional or bidirectional. Its use enables a reduction of the harmonics of the currents drawn from or injected to three phase power lines. It has a lower cost and size compared to the state of art solutions.

Figure 4A:
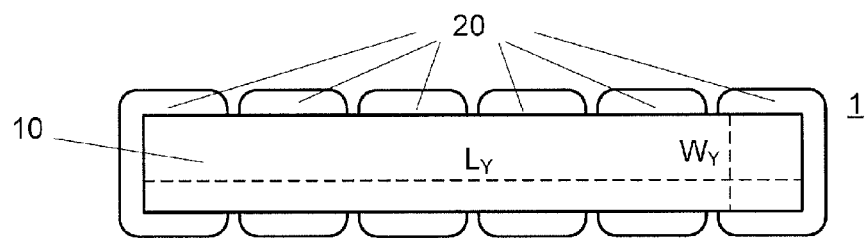
FIGS. 4A, 4B and 4C show respectively a top view, a side view and another top view with removed common yokes of one embodiment of the integrated magnetic device for low harmonics three-phase front-end according to the invention.
Figure 4B:
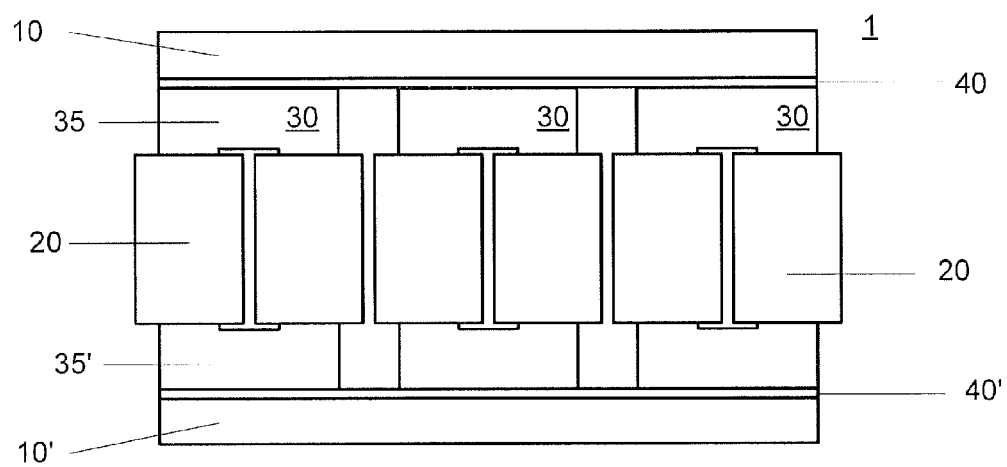
Figure 4C:
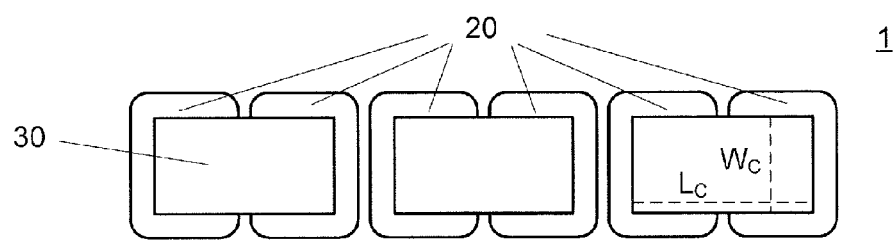

FIGS. 4A, 4B and 4C show respectively a top view, a side view and another top view with removed common yoke of one possible embodiment of the device 1 according to the invention. In this embodiment the device 1 comprises three magnetic sub-assemblies 30, wherein each magnetic sub-assembly 30 comprises two wound limbs and at least three windings. In this represented case, the three magnetic sub-assemblies have identical limbs. In another embodiment the cross-section of two limbs can be different, for example depending on the magnetic flux. In low or medium power applications, i.e. applications with a power inferior to 50 kW, each wound limb can comprise a bobbin 20. For high power applications, the windings are wound on the magnetic sub-assemblies without bobbins, by using four or more plastic space holders for distancing the windings from the sub-assembly.

Figure 1A:
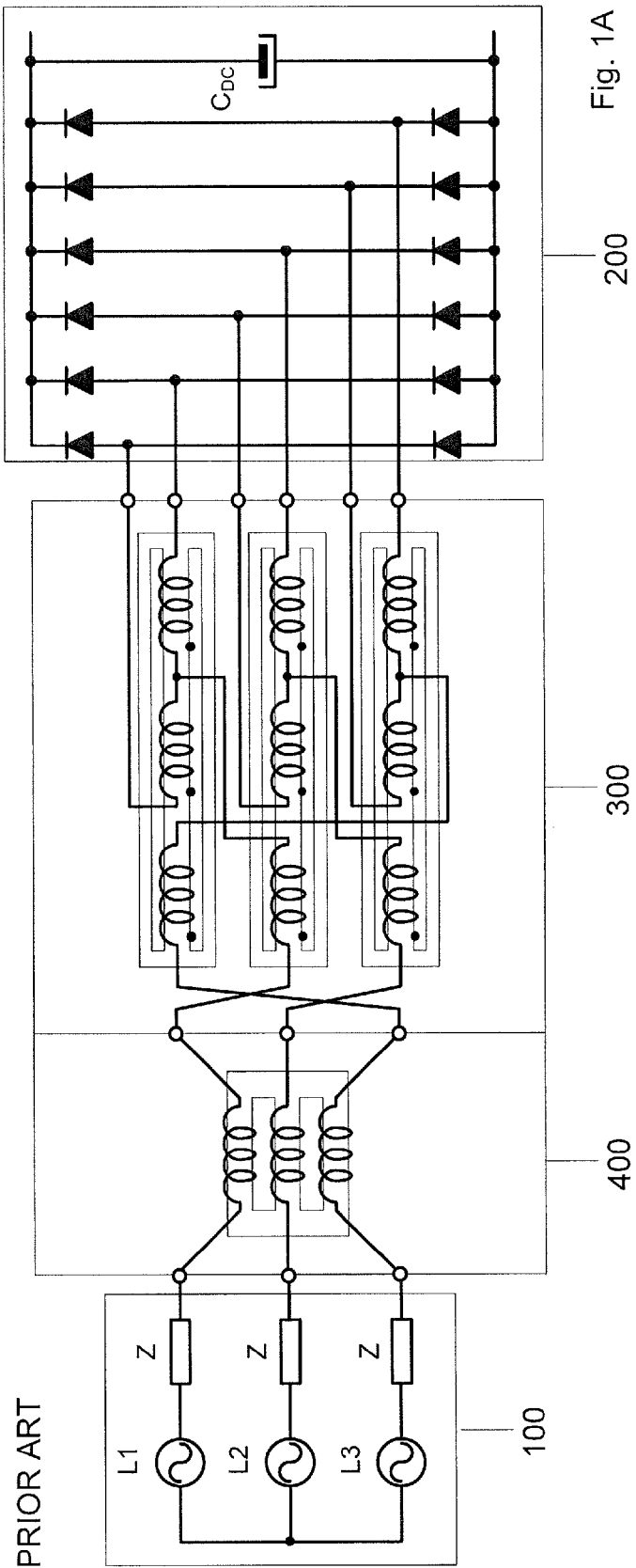
FIG. 1A shows an example of state of the art solution with a three-phase inductor and a splitter with three magnetic devices connected between a three-phase power line and a load comprising a 12-pulse rectifier.
Figure 1B:
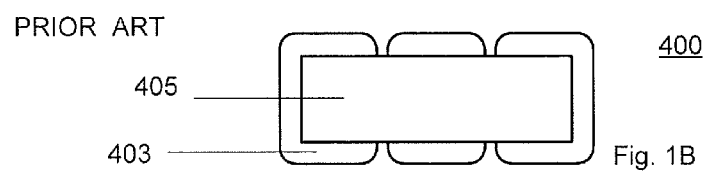
FIG. 1B and FIG. 1C show respectively a top view and a side view of a three-phase inductor being part of the state of the art solution.
Figure 1C:
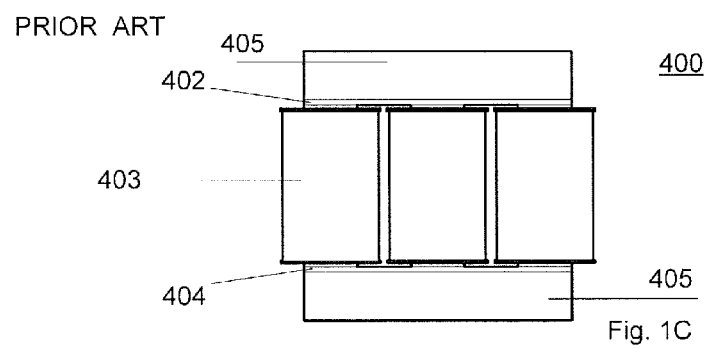
Figure 1D:
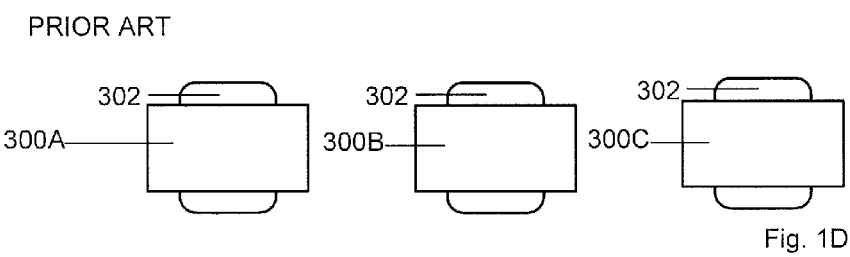
FIG. 1D and FIG. 1E show respectively a top view and a side view of a three magnetic devices being another part of the state of the art solution, namely a splitter.
Figure 1E:
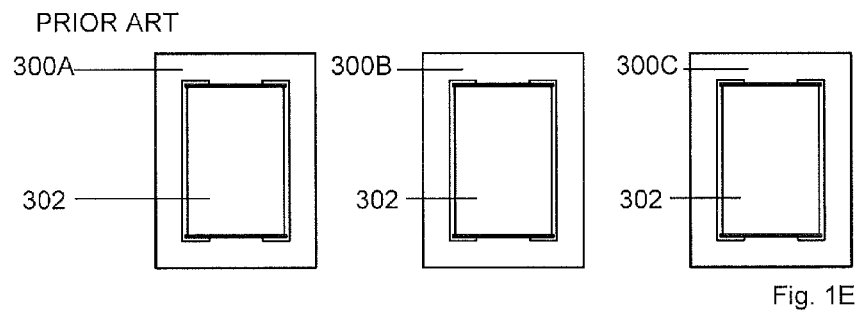

Each of the three magnetic sub-assemblies 30 comprises a first yoke 35 and a second yoke 35' which constitute together with the two limbs the close magnetic loop without air-gaps. Compared to a conventional choke, for example the three-phase inductor 400 of FIG. 1C, the device of the invention comprises three magnetic sub-assemblies instead of three limbs.

Advantageously the net sum of the magnetic fluxes of positive and negative sequence components, both for fundamental frequency and harmonics, entering into the first respectively second common yokes is zero. In other words, no flux radiates outside the device.

In this embodiment the device comprises one first common yoke 10 and one second common yoke 10' which are identical and which magnetically connect the three separated magnetic sub-assemblies 30, i.e. the two common yokes 10 and 10' are juxtaposed on the top respectively on the bottom of the three separated magnetic sub-assemblies 30.

The device comprises two air-gaps 40 and 40', i.e. a first and a second air-gaps respectively between the top and the bottom of the three magnetic sub-assemblies 30 and the first 10 respectively second 10' common yoke. The device of the invention can comprises only one air-gap between the three magnetic sub-assemblies 30 and one of the two common yokes 10 and 10'.

In this embodiment the first common yoke 10 and the second common yoke 10' have a rectangular shape. In this case the three magnetic sub-assemblies 30 are aligned, i.e. the rectangular hole between the two wound limbs of one magnetic sub-assembly 30 is aligned with the holes of the other two magnetic sub-assemblies 30. In the embodiment represented in FIGS. 4A to 4C, the width $W_Y$ of the cross-section of the common yokes 10, 10' is equal to the width $W_C$ of the cross-section of each magnetic sub-assembly 30. In a preferred embodiment each of the three magnetic sub-assemblies 30 has a rectangular section, with a length $L_C$ of the cross-section superior to its width $W_C$.

In a preferred embodiment the length $L_Y$ of the cross-section of the common yokes 10, 10' is superior to three times the length $L_c$ of the cross-section of the magnetic sub-assemblies 30, i.e. $L_Y > 3 * L_C$ as shown in FIGS. 4A to 4C.

Figure 5A:
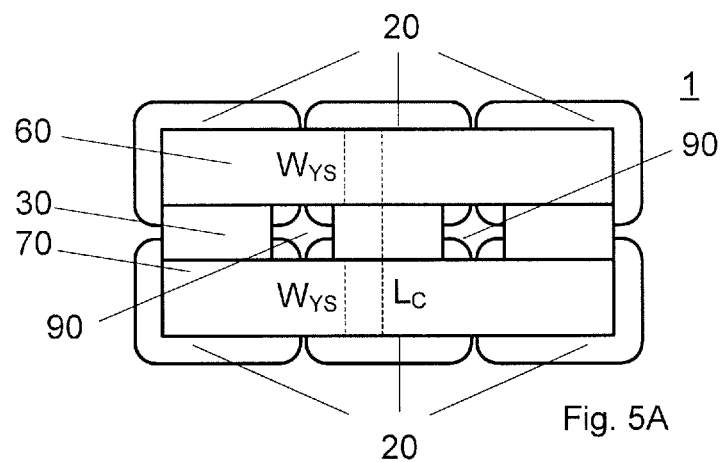
FIGS. 5A, 5B and 5C show respectively a top view, a side view and another top view with removed common yokes of another embodiment of the integrated magnetic device for low harmonics three-phase front-end according to the invention.
Figure 5B:
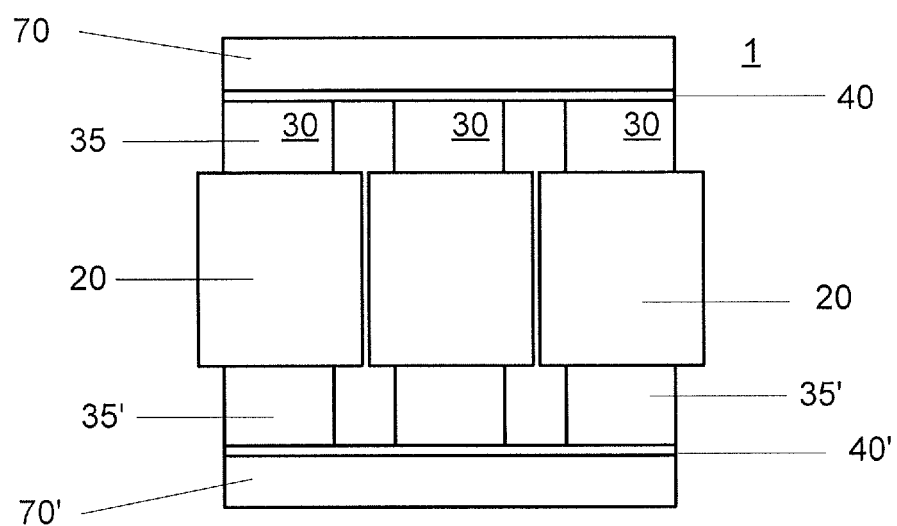
Figure 5C:
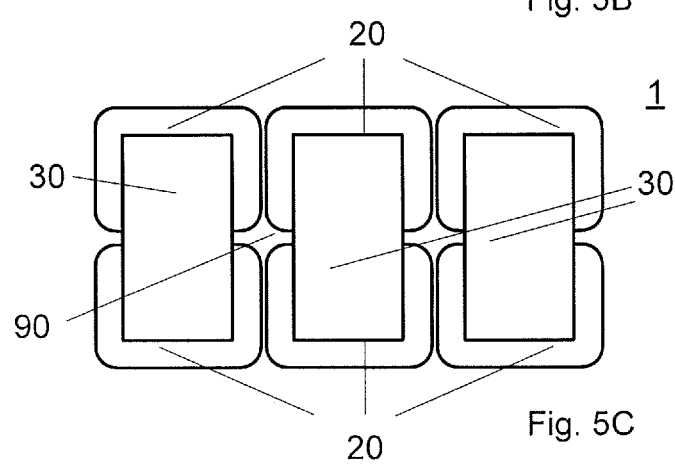

In the embodiment of FIGS. 5A to 5C the three magnetic sub-assemblies 30 are parallel, i.e. the rectangular hole between the two wound limbs of one magnetic sub-assembly 30 is in front of the rectangular hole between the two wound limbs of another magnetic sub-assembly 30.

In this embodiment there are two first common yokes 60, 70 and two second common yokes 60', 70' having a rectangular shape and a width $W_{YS}$ inferior to the half of the length $L_C$ of the cross-section of the three magnetic sub-assemblies.

In this manner the integrated magnetic device 1 of this embodiment advantageously comprises two holes 90 which can be used for cooling it.

Again, the device 1 can comprise at least one air-gap between the three magnetic sub-assemblies 30 and the first common yokes 60, 70 and the second common yokes 60', 70'. In a preferred embodiment it comprises two air-gaps, a first air-gap 40 between the first yoke 35 of each magnetic sub-assembly 30 and the first common yokes 60, 70 and a second air-gap 40' between the second yoke 35' of each magnetic sub-assembly 30 and the second common yokes 60', 70'.

Figure 6A:
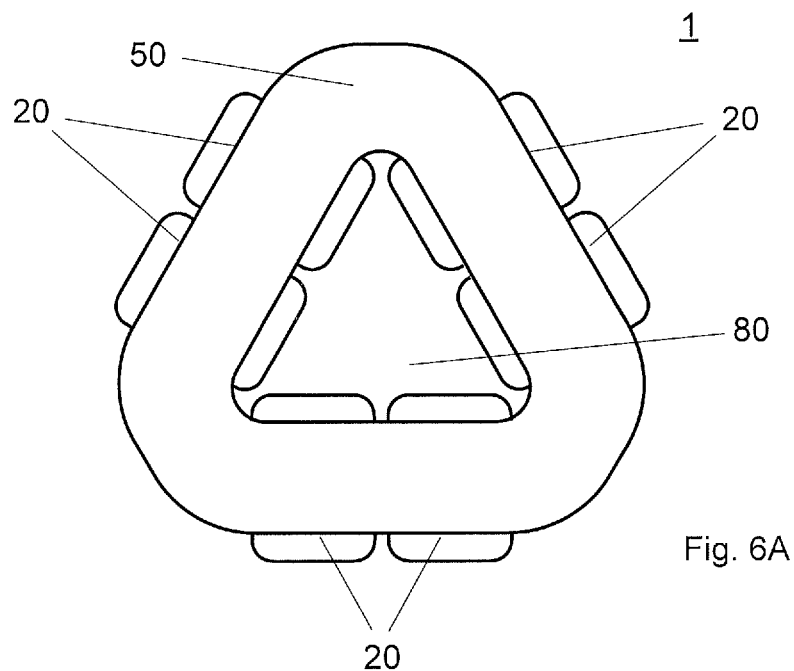
FIGS. 6A, 6B and 6C show respectively a top view, a side view and another top view with removed common yokes of another embodiment of the integrated magnetic device for low harmonics three-phase front-end according to the invention.
Figure 6C:
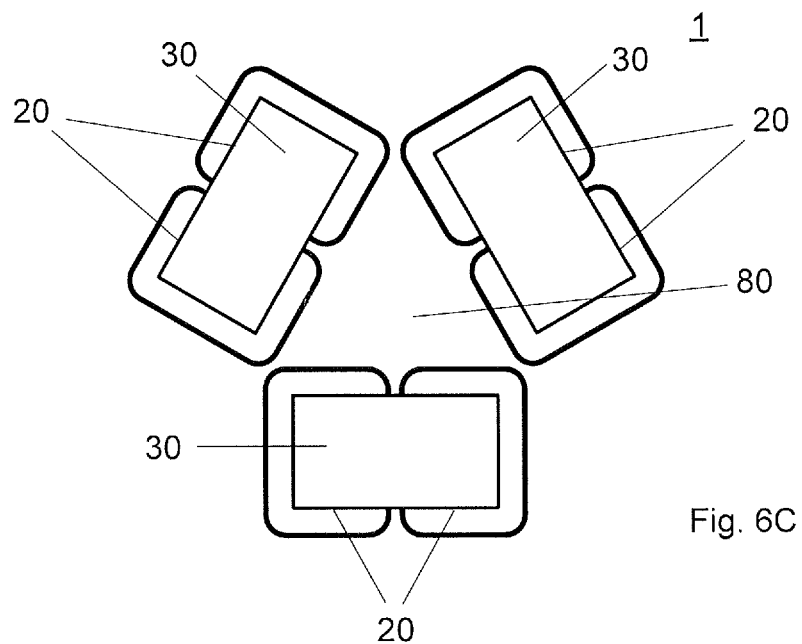
Figure 6B:
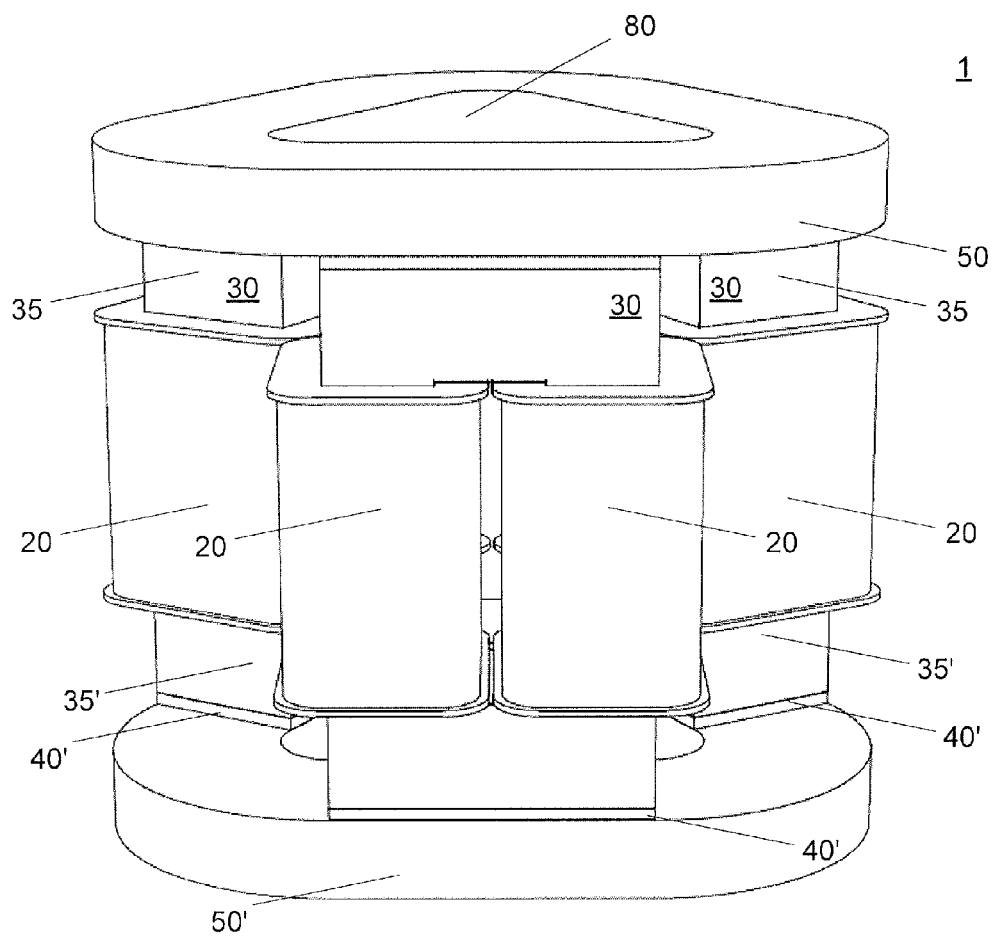

In the embodiment of FIGS. 6A to 6C, which show a top view, another top view with removed common yokes and a side view of the magnetic device 1, there are one first 50 and one second 50' common yokes having a triangular shape. In this case the three magnetic sub-assemblies 30 are disposed triangularly. In another embodiment the first 50 and second 50' common yokes have a circular or polygonal shape and the three magnetic sub-assemblies 30 are disposed respectively in a circular or polygonal manner. In one particular embodiment the width of the cross-section of the common yokes 50, 50' is equal to the width of the cross-section of a magnetic sub-assembly 30.

The device comprises a central hole 80. In the illustrated embodiment the hole 80 is triangular. An air flow can advantageously pass through this hole 80 and efficiently cools the device. Moreover this embodiment is easy to produce and has a better symmetry than the previous embodiments, i.e. it is characterised by identical parameters for all the three phases. The embodiment of FIGS. 6A to 6C in other words ensures full symmetry of the device and allows identical conditions for the windings around the wound limbs.

Even if the device 1 illustrated in FIG. 6C comprises two air-gaps, a first air-gap 40 between the three magnetic sub-assemblies 30 and the first common yoke 50 and a second air-gap 40' between the three magnetic sub-assemblies 30 and the second common yoke 50', it can comprise only one air-gap, 40 or 40'.

Advantageously the three magnetic sub-assemblies 30 can be made by using interleaved UI laminations.

The device 1 has three current inputs connectable to a three phase power line or grid 100 and at least two current outputs for each current input. In one preferred embodiment the device has six current outputs, i.e. two current outputs for each current input. In general the current inputs belong to the three-phase side of the converter and the current outputs to the six or multi-phase side of the same converter.

The current outputs are galvanically connected to the three current inputs and can be connected to a load 200. The device transforms three-phase inputs into six-phase outputs.

When said device is connected between the three phase power grid 100 and a load, for example a non linear load 200 comprising a 12 pulse-rectifier followed by a DC link and a generic DC load, the fundamental components of the currents flowing in each of the current outputs are phase shifted of a predetermined angle φ/2 respect to the corresponding fundamental component of the current flowing in the current input.

The juxtaposition of the first and second common yokes on the three magnetic sub-assemblies creates a magnetic connection between these three magnetic sub-assemblies 30 and the presence of at least one air-gap allows the device to perform also an inductor's function.

The device 1 allows saving material and has a lower size and weight compared to a conventional transformer. The dimensions of the device 1 in the embodiment of FIGS. 4A to 4C depend on the power converted by the system. The device according to the invention uses about one quarter of the material used in a transformer for the same power converter. The reduction of the material compared to the state of the art solutions described above is about of the 20%. Then the dimensions and the mass of the device 1 according to the invention are lower than the dimensions and the mass of the conventional transformer for the same power twelve-pulse rectifier and than the solutions of the state of the art.

In one embodiment each of the three magnetic sub-assemblies 30 is a laminated iron or for higher frequencies ferromagnetic sub-core. The magnetic sub-core can be a stacked core, i.e. a core made by stacking layers of thin silicon iron laminations. Each lamination is insulated from its neighbours by a thin non-conducting layer of insulation. The effect of laminations is to confine eddy currents and to reduce their magnitude. Thinner laminations reduce losses, but are more laborious and expensive to construct.

Cut cores as the C-Cores are strip wound cores, impregnated after annealing, then cut in parts and lapped.

Since these cores are assembled around the bobbins in a very short time, the device 1 of this embodiment takes less time to manufacture the device.

Figure 7A:
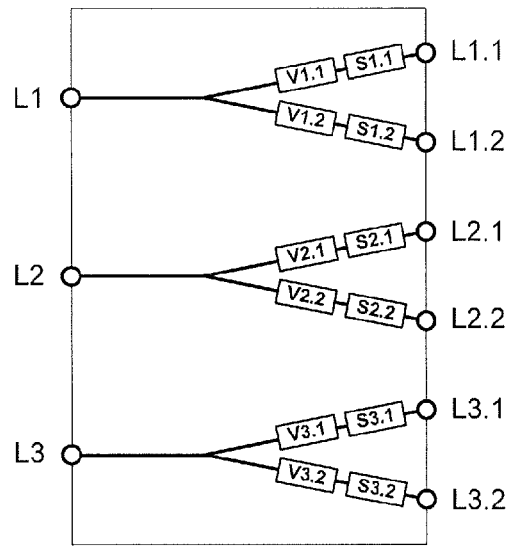
FIGS. 7A, 8A, 9A . . . 18A show different embodiments of the windings of the device according to one aspect of the invention.
Figure 8A:
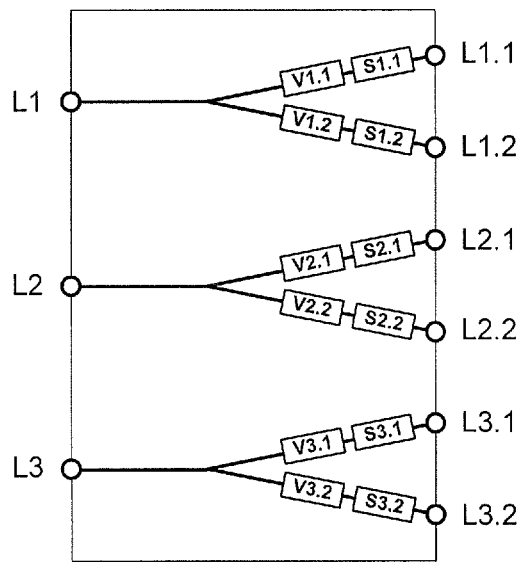
Figure 9A:
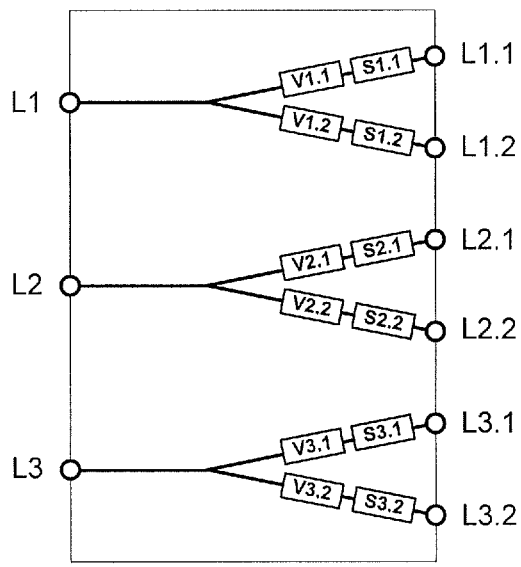

FIG. 7A, 8A, 9A . . . 18A show different embodiments of the windings of the device according to one aspect of the invention.

Figure 7B:
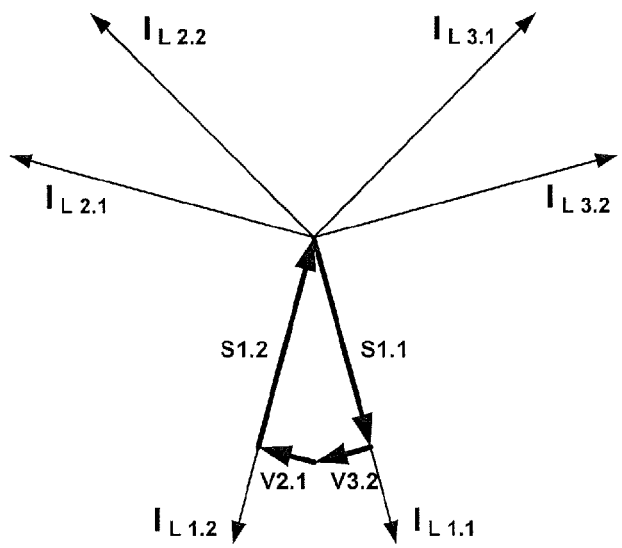
FIGS. 7B, 8B, 9B . . . 18B show a phasor diagram of MMF vectors of one of the three magnetic sub-assemblies of the device according to one aspect of the invention.
Figure 8B:
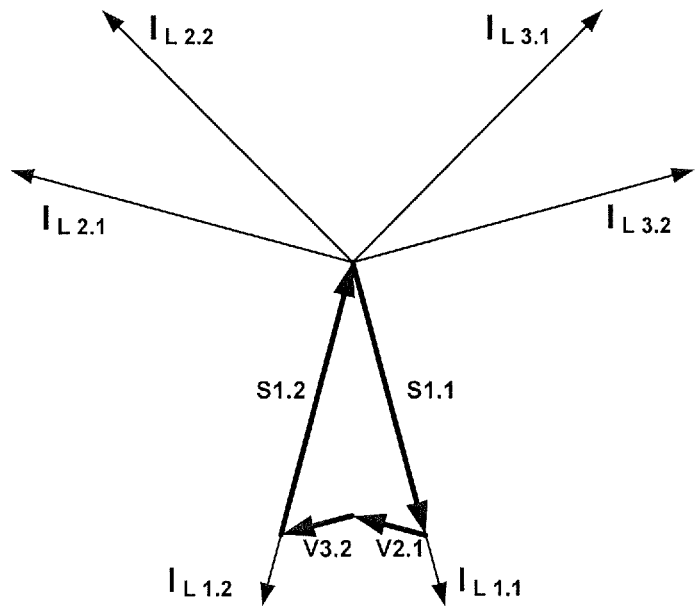
Figure 9B:
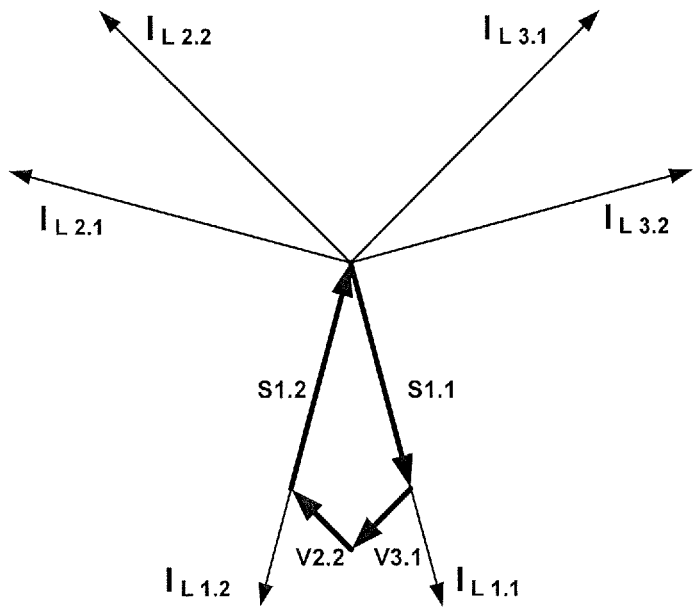

FIG. 7B, 8B, 9B . . . 18B show a phasor diagram of MMF vectors of one of the three magnetic sub-assemblies of the device according to one aspect of the invention.

Figure 7C:
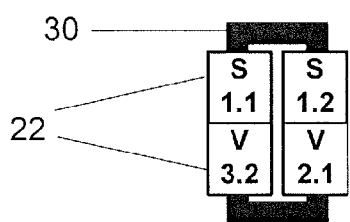
FIGS. 7C, 8C, 9C . . . 18C.
Figure 7D:
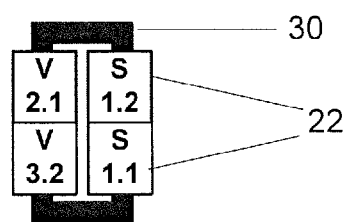
FIGS. 7D, 8D, 9D . . . 18D.
Figure 8C:
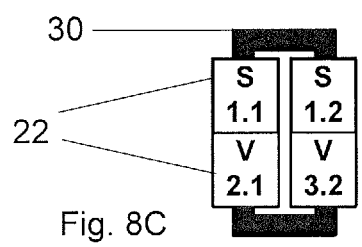
Figure 8D:
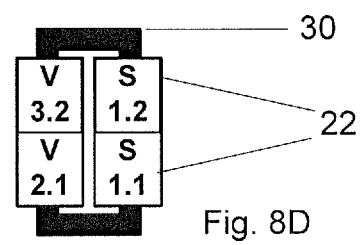
Figure 9C:
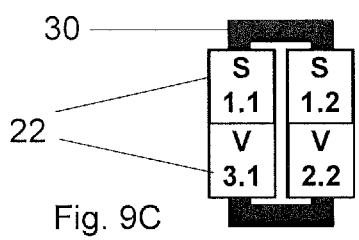
Figure 9D:
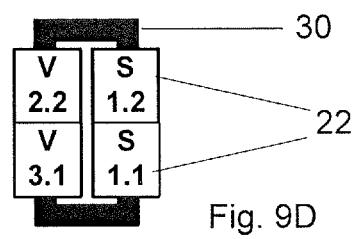
Figure 10A:
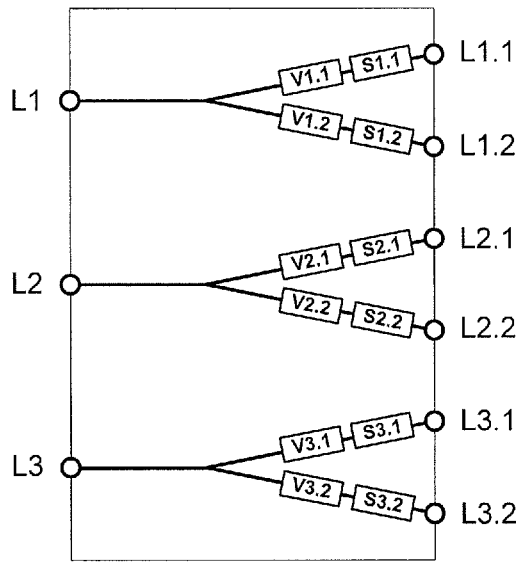
Figure 10B:
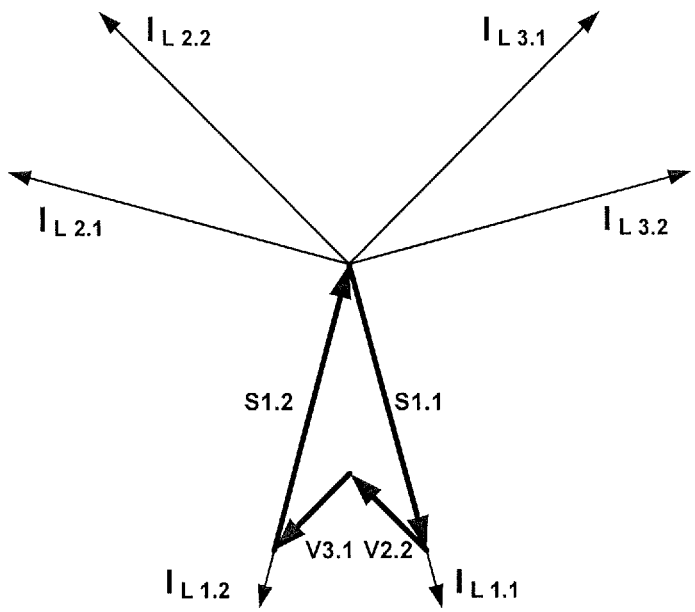
Figure 10C:
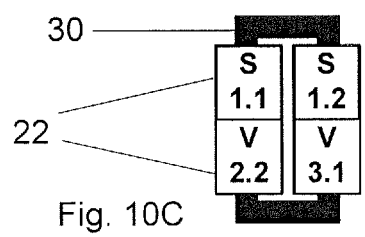
Figure 10D:
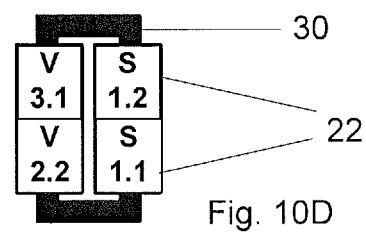
Figure 14A:
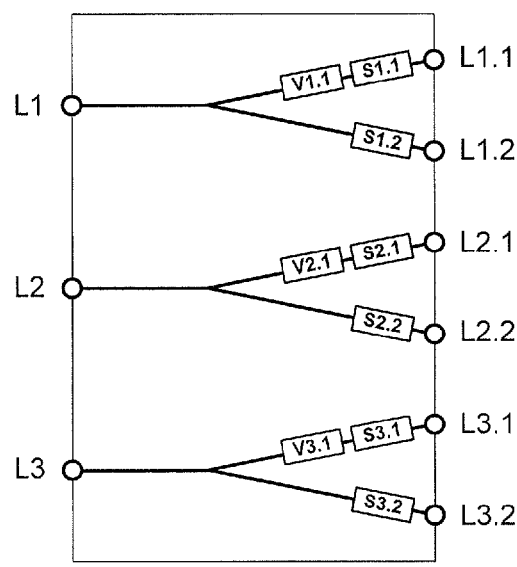
Figure 14B:
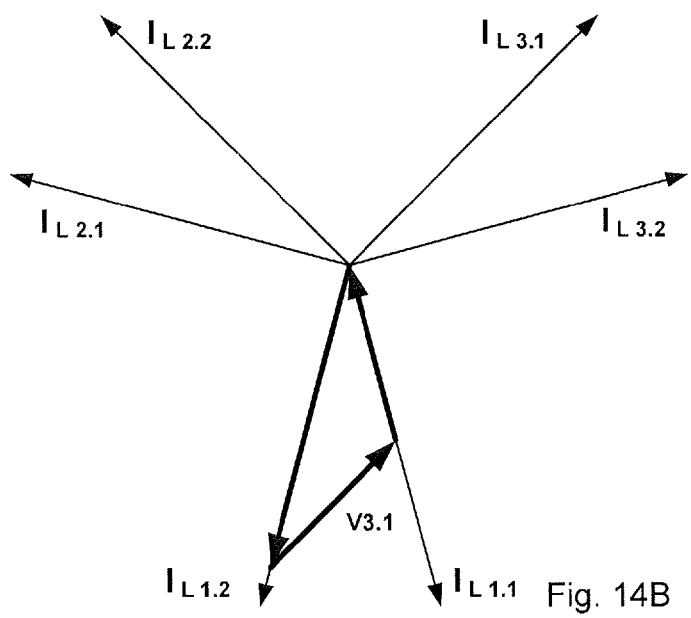
Figure 14C:
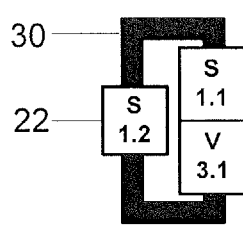
Figure 14D:
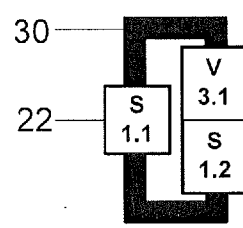
Figure 14E:
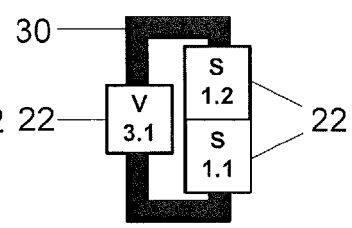
Figure 15A:
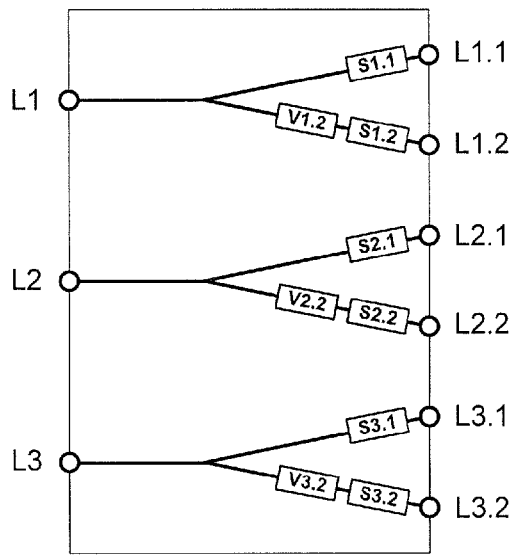
Figure 15B:
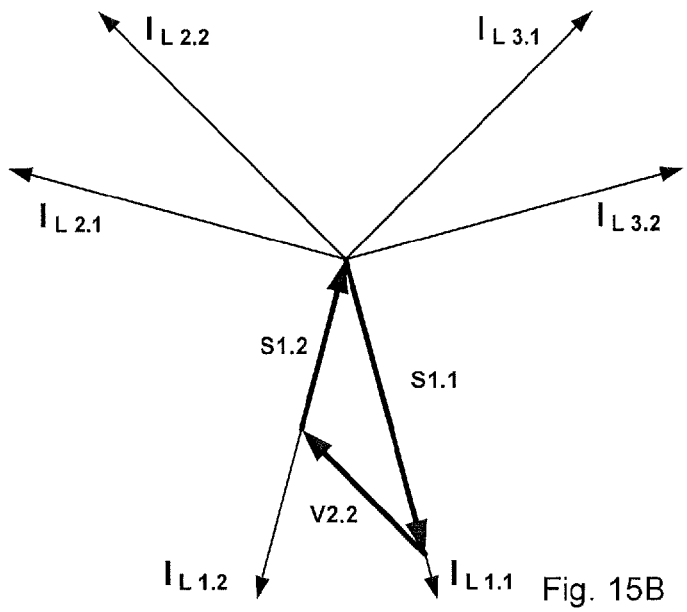
Figure 15C:
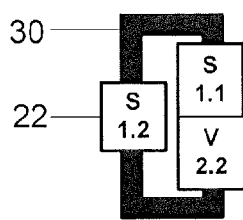
Figure 15D:
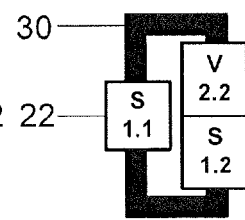
Figure 15E:
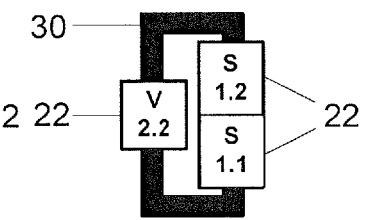
Figure 16A:
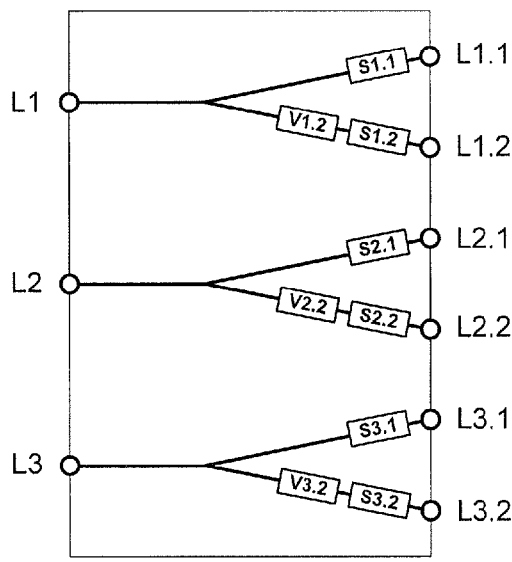
Figure 16B:
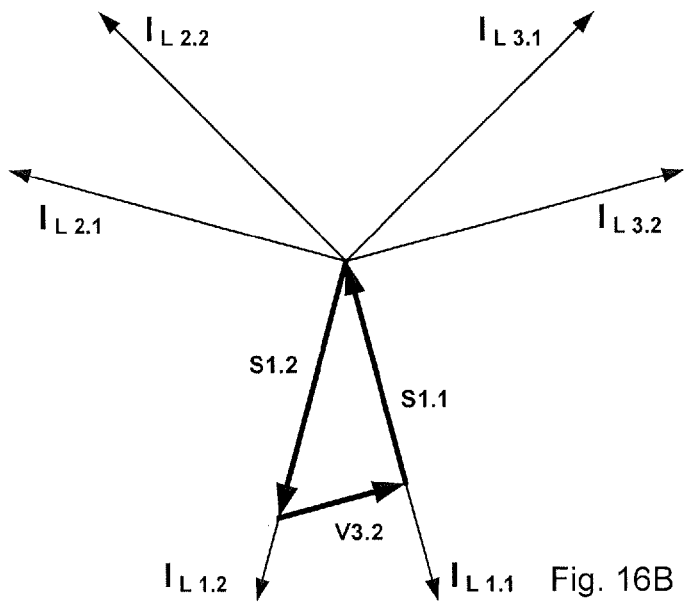
Figure 16C:
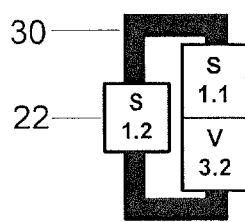
Figure 16D:
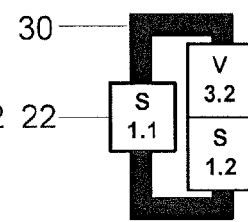
Figure 16E:
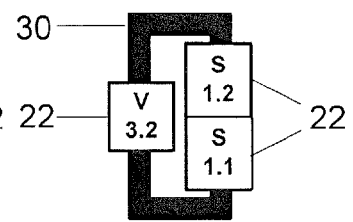

FIG. 7C, 8C, 9C . . . 18C; FIG. 7D, 8D, 9D . . . 18D; FIG. 13E, 14E, 15E . . . 18E show position of the windings on the limbs of one of the three magnetic sub-assemblies of the device according to one aspect of the invention.

In the embodiment of FIGS. 7C and 7D each magnetic sub-assembly 30 contains two windings 22 for each wound limb: in particular each limb comprises one split winding S and one spreader winding V. The name for the windings is explained referring to FIG. 7B, which is a representation of the MMF (Magneto-Motive Force) vectors.

In order to have a splitting device as described, the following constraint for each close magnetic circuit has to be satisfied: the sum of the MMFs of this magnetic circuit has to be zero. A MMF related to one winding is done by the instantaneous value of the current flowing in this winding multiplied by its number of turns. In other words it means that the MMF vectors of a magnetic circuit have to form a close path.

In the embodiment of FIG. 7B there is one magnetic circuit for the considered magnetic sub-assembly 30, comprising a close quadrilateral path. In this path formed by the MMF vectors S1.2, S1.1, V3.2 and V2.1, S1.2 and S1.1 work respectively as a split lagging vector (lagging because it corresponds to the lagging current $I_{1.2}$ flowing in the electrical circuit shown in FIG. 7A) and as a split leading vector (leading because it corresponds to the leading current $I_{1.1}$).

V3.2 and V2.1 are in this case a spreader because they close the quadrilateral path made by these four vectors. In particular V3.2 works as a spreader lagging vector (lagging because it corresponds to the lagging current $I_{3.2}$ flowing in the electrical circuit shown in FIG. 7A) and V2.1 works as a spreader leading vector (leading because it corresponds to the leading current $I_{2.1}$).

In general each split winding conducts one split current and each spreader winding conducts one phase current, i.e. $I_{L1}, I_{L2}$ or $I_{L3}$ or one split currents $I_{s1.1}, I_{S1.2}, I_{S2.1}, I_{S2.2}, I_{S3.1}, I_{S3.2}$. A spreader winding V can conduct any type of current. In one embodiment the spreader winding V of a limb of the device can conduct a split or common current of another limb of the same device. In another embodiment the vector spreader winding V can conduct an external and controllable current.

In the embodiment of FIG. 7C each wound limb contains one split leading/lagging winding 22 and one spread lagging/leading winding 22. In the embodiment of FIG. 7D one wound limb contains two spreader leading/lagging windings 22 and the other one wound limb contains two split lagging/leading windings 22. In both cases, the device 1 then comprises twelve windings. In this case the spreader windings V of a limb of one magnetic sub-assembly 30 are split windings S of one of the other two magnetic sub-assemblies 30 of the same device. As shown in FIG. 7A, in such a case each of the three common paths in the electrical circuit of the device does not contain windings. Each split path contains two windings.

FIGS. 8A to 8D show another embodiment in which each magnetic sub-assembly 30 contains two windings 22 for each wound limb. In the embodiment of FIG. 8C each wound limb contains one split leading/lagging winding 22 and one spread leading/lagging winding 22. In the embodiment of FIG. 8D one wound limb contains two spreader leading/lagging windings 22 and the other one wound limb contains two split leading/lagging windings 22. Again in both cases the device 1 then comprises twelve windings. Again the spreader windings V of a limb of one magnetic sub-assembly 30 are split windings S of one of the other two magnetic sub-assemblies 30 of the same device. As shown in FIG. 8A, again case each of the three common paths in the electrical circuit of the device does not contain windings.

FIGS. 9A to 9D show another embodiment in which each magnetic sub-assembly 30 contains two windings 22 for each wound limb. In the embodiment of FIG. 9C each wound limb contains one split winding 22 and one spread winding 22. In the embodiment of FIG. 9D one wound limb contains two spreader leading/lagging windings 22 and the other one wound limb contains two split lagging/leading windings 22. Again in both cases the device 1 then comprises twelve windings. Again the spreader windings V of a limb of one magnetic sub-assembly 30 are split windings S of one of the other two magnetic sub-assemblies 30 of the same device. Again, as shown in FIG. 9A, in such a case each of the three common paths in the electrical circuit of the device does not contain windings.

FIGS. 10A to 10D show another embodiment of the invention, for which the same considerations made for FIGS. 9A to 9D are still valid.

Figure 11A:
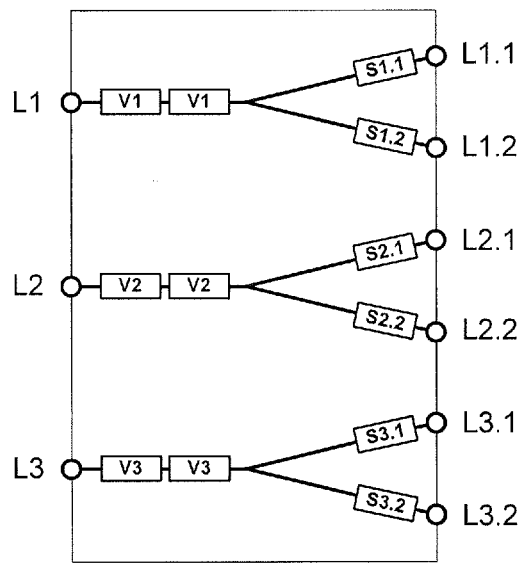
Figure 11B:
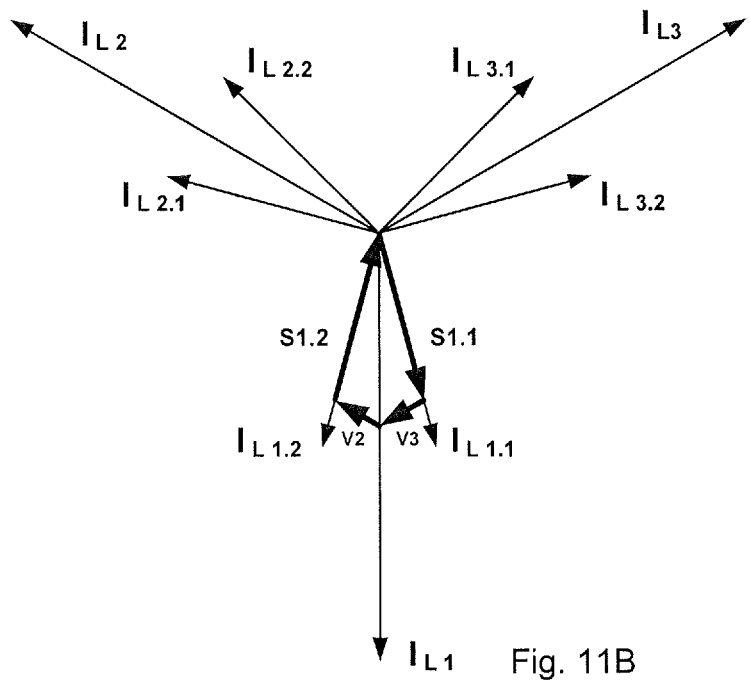
Figure 11C:
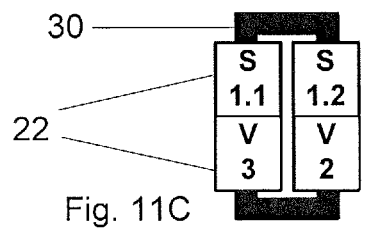
Figure 11D:
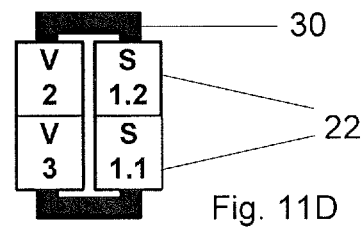

FIGS. 11A to 11D show another embodiment in which each magnetic sub-assembly 30 contains two windings 22 for each wound limb. In the embodiment of FIG. 11C each wound limb contains one split leading winding 22 and one spread common winding 22. In the embodiment of FIG. 11D one wound limb contains two spreader common windings 22 and the other one wound limb contains two split lagging/leading windings 22. In both cases the device 1 then comprises twelve windings. In this case, as shown in FIG. 9A, each of the three common paths in the electrical circuit of the device contains two spreader common windings and each split path contains one split winding (leading or lagging).

FIGS. 12A to 12D show another embodiment of the invention, for which the same considerations made for FIGS. 11A to 11D are still valid.

Figure 13A:
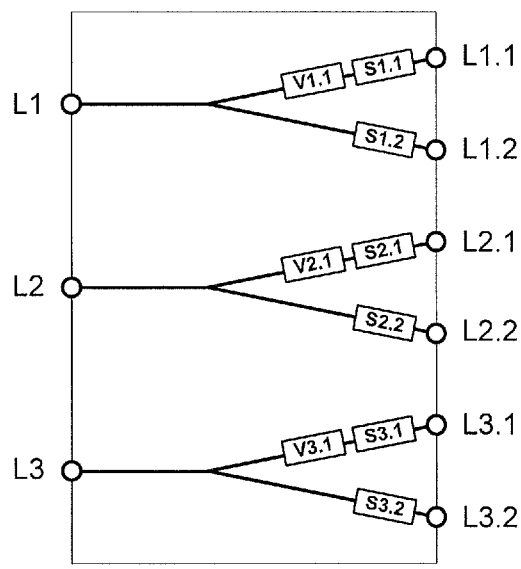
FIGS. 13E, 14E, 15E . . . 18E show position of the windings on the limbs of one of the three magnetic sub-assemblies of the device according to one aspect of the invention.
Figure 13B:
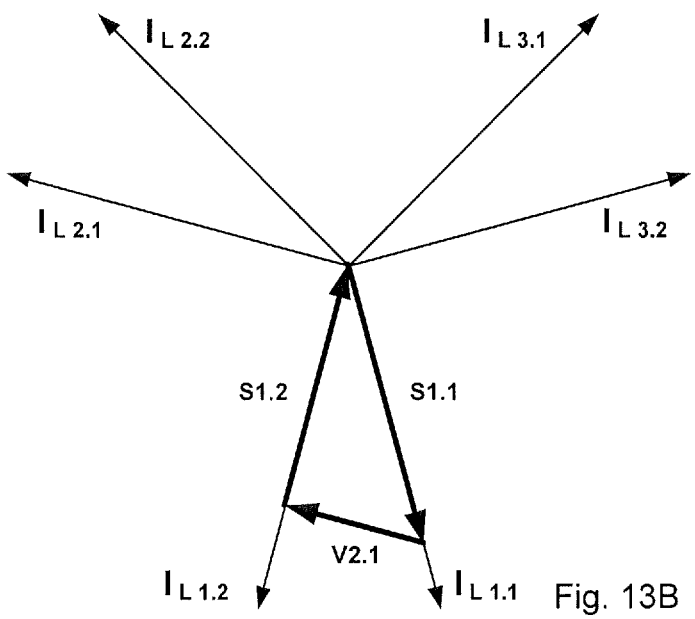
Figure 13C:
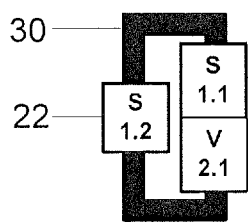
Figure 13D:
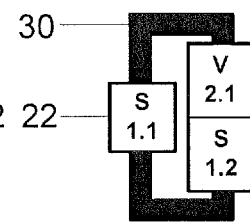
Figure 13E:
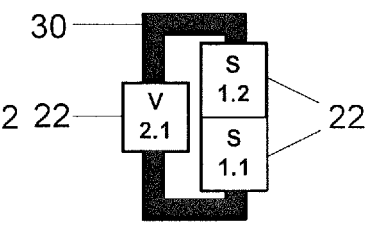

FIGS. 13A to 13E show another embodiment in which each magnetic sub-assembly 30 contains three windings 22, in particular one wound limb contains one winding and the second two windings. Two of the three windings 22 are split windings and the remaining winding is a spreader winding. FIGS. 13C to 13E show possible combinations of the three windings. In this case the device 1 comprises nine windings. Again the spreader windings V of a limb of one magnetic sub-assembly 30 are split windings S of one of the other two magnetic sub-assemblies 30 of the same device. As shown in FIG. 13A, in such a case each of the three common paths in the electrical circuit of the device does not contain windings.

FIGS. 14A to 16E show other embodiments of the invention, for which the same considerations made for FIGS. 13A to 13E are still valid.

Figure 17A:
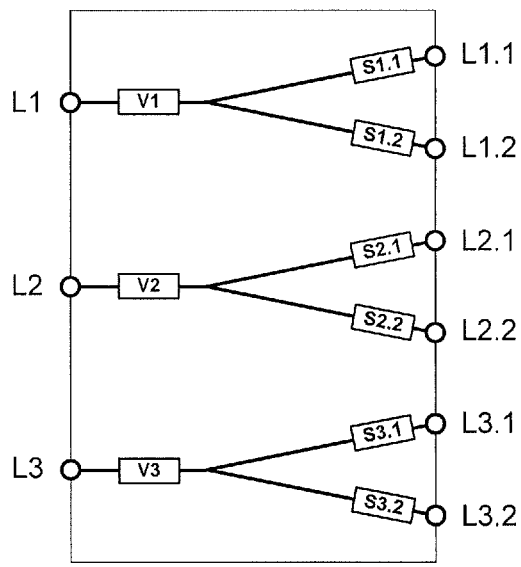
Figure 17B:
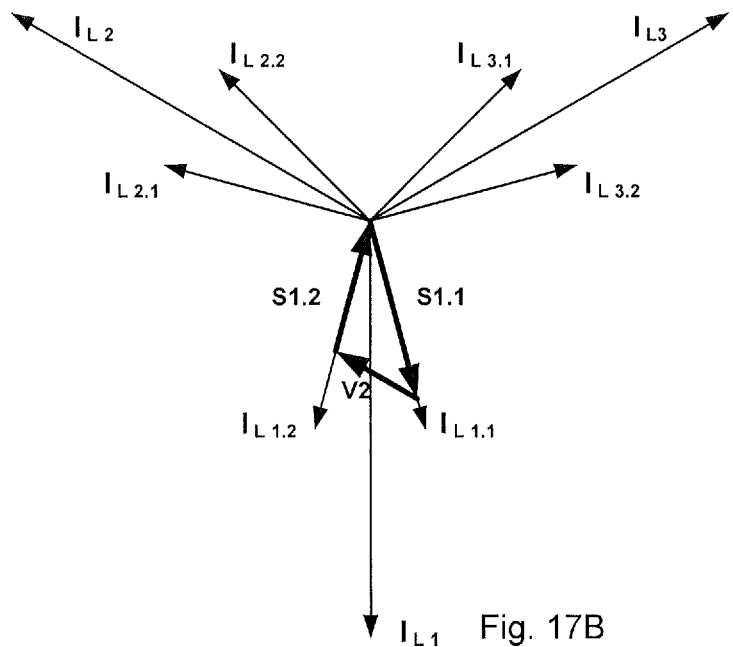
Figure 17C:
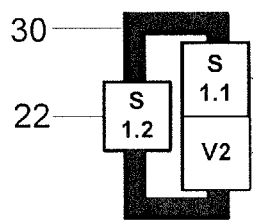
Figure 17D:
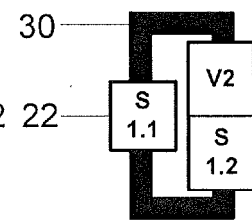
Figure 17E:
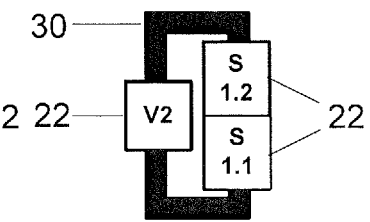

FIGS. 17A to 17E show another embodiment in which again the device 1 comprises nine windings. In this case, as shown in FIG. 17A, each of the three common paths in the electrical circuit of the device contains one spreader common winding and each split path contains one split winding (leading or lagging).

FIGS. 18A to 18E show another embodiment of the invention, for which the same considerations made for FIGS. 17A to 17E are still valid.

In other words the device 1 comprises two classes depending on the total number of windings: the first class is constituted by devices comprising nine windings, i.e. three windings for each magnetic sub-assembly 30, one winding on a wound limb and two windings on the other wound limb as shown in FIGS. 13A to 18E, which illustrate all the possible combinations for the three windings on a magnetic sub-assembly 30; the second class is constituted by devices comprising twelve windings, i.e. four windings for each magnetic sub-assembly 30, two windings for each wound limb as shown in FIGS. 7A to 12D, which illustrate all the possible combinations for the four windings on a magnetic sub-assembly 30.

Figure 3A:
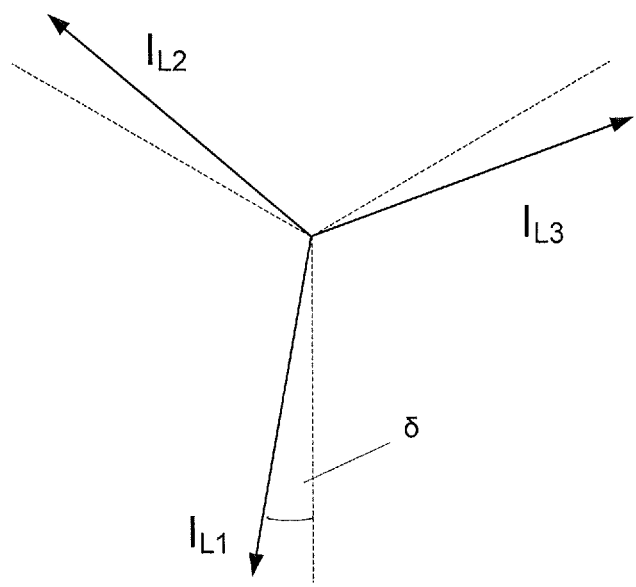
FIG. 3A shows a phasor diagram of the input or common currents of a device of FIG. 2 with three phase inductor and splitter with three magnetic devices of the state of the art.
Figure 3B:
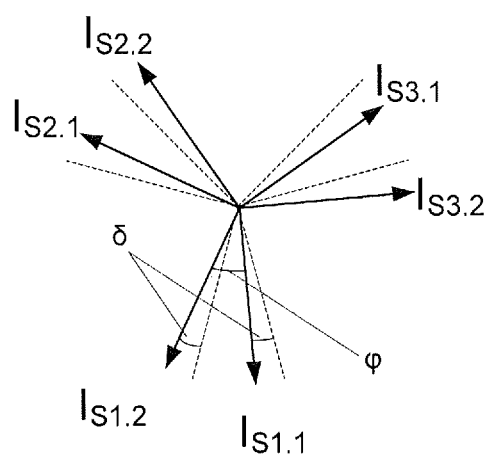
FIG. 3B shows a phasor diagram of the split currents, comprising leading split currents and lagging split currents, of a device of FIG. 2 with three phase inductor and splitter with three magnetic devices of the state of the art.

Since some energy can be stored in a magnetic field inside the at least one air-gap of the device, a lagging angle or phase shift angle δ shown in FIG. 3A between each of the voltage phasors of the power grid 100 and the corresponding input current $I_{L1}, I_{L2}, I_{L3}$ of the magnetic device can be observed. In this case the inductor's function is integrated in the device. Moreover the value of the inductance is easy to control.

The use of the magnetic device 1 in a power converter allows the use of 12-diode rectifier and thus elimination of the $5^{th}$ and $7^{th}$, $17^{th}$ and $19^{th}$, $29^{th}$ and $31^{th}$ harmonics. Tests have shown that the Total Harmonic Distortion (THD) can be inferior to about 13%. In the case of a 6-diodes rectifier with a DC link choke for example, harmonics are not eliminated and the THD is not better than 40%.

As shown in the electrical circuits of FIGS. 7A, 8A, . . . , 17A and 18A, the device 1 according to the invention contains three common-paths belonging to phases L1, L2, L3 and six split-paths, belonging to a phase 1 (L1.1. and L1.2), to phase 2 (L2.1 and L2.2) and the phase 3 (L3.1 and L3.2). In another embodiment the number of split-paths can be more than two per phase. When this device is used in an AC/DC power rectifier and then the current goes from an AC input to a DC output, as described above the device 1 works as a phase shifting current splitter. In fact the current flowing in the common path is split into two or more identical but phase shifted components flowing in the split paths. In another embodiment the number of the split paths can be three or more.

Advantageously the device 1 can be used in a DC/AC power converter. In such a case the current goes from a DC input to an AC output and the device 1 works as a phase shifting current merger. In fact the current flowing in the split paths is merged into a common path. Also in this case the number of the split paths can be three or more.

In other words, for each phase of the three input lines connectable to a three phase power grid 100 a phase shifting current splitter/merger device 1 can be used. When this device works as a splitter, it splits an input current into two or more split currents having controllable phase shift and amplitude; when it works as a merger, it combines two or more split currents with controllable phase shift and amplitude into an output current.

Figure 12A:
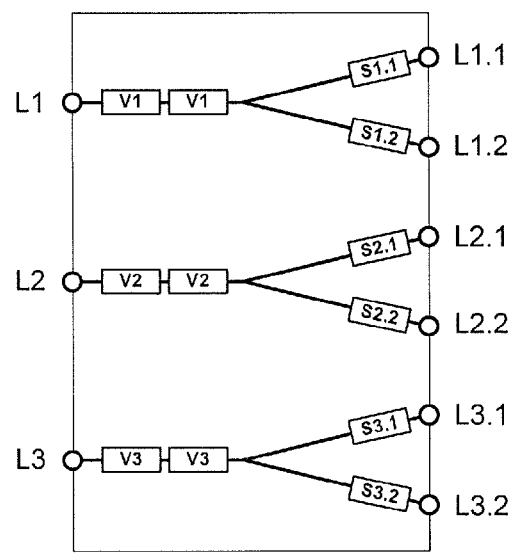
Figure 12B:
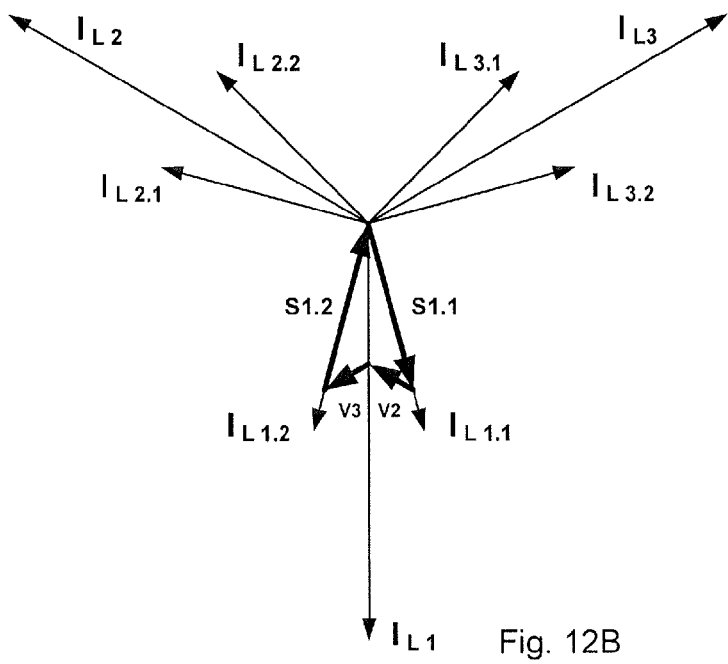
Figure 12C:
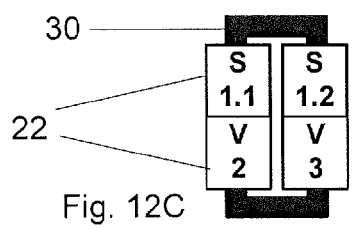
Figure 12D:
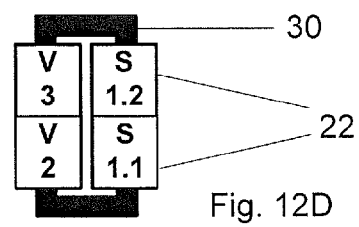

The common path of the device 1 according to the invention can comprise zero (FIGS. 7A to 10A and 13A to 16A), one (FIGS. 17A and 18A) or two spreader windings (FIGS. 11A and 12A). Each split path can comprise one split winding (FIGS. 11A to 12A and 17A to 18A) or one split winding and one spreader winding (FIGS. 7A to 10A and 13A to 16A). Depending on the number and the position of windings in the common and split paths, a classification comprising different kinds of device can be built.

The number of turns of windings is selected so that the amplitude of the fundamental frequency component of the split currents flowing in the split paths is identical and the phase shift between the fundamental frequency components of split currents is equal to a predetermined angle. In a preferred embodiment the value of this angle is 30°.

Figure 19:
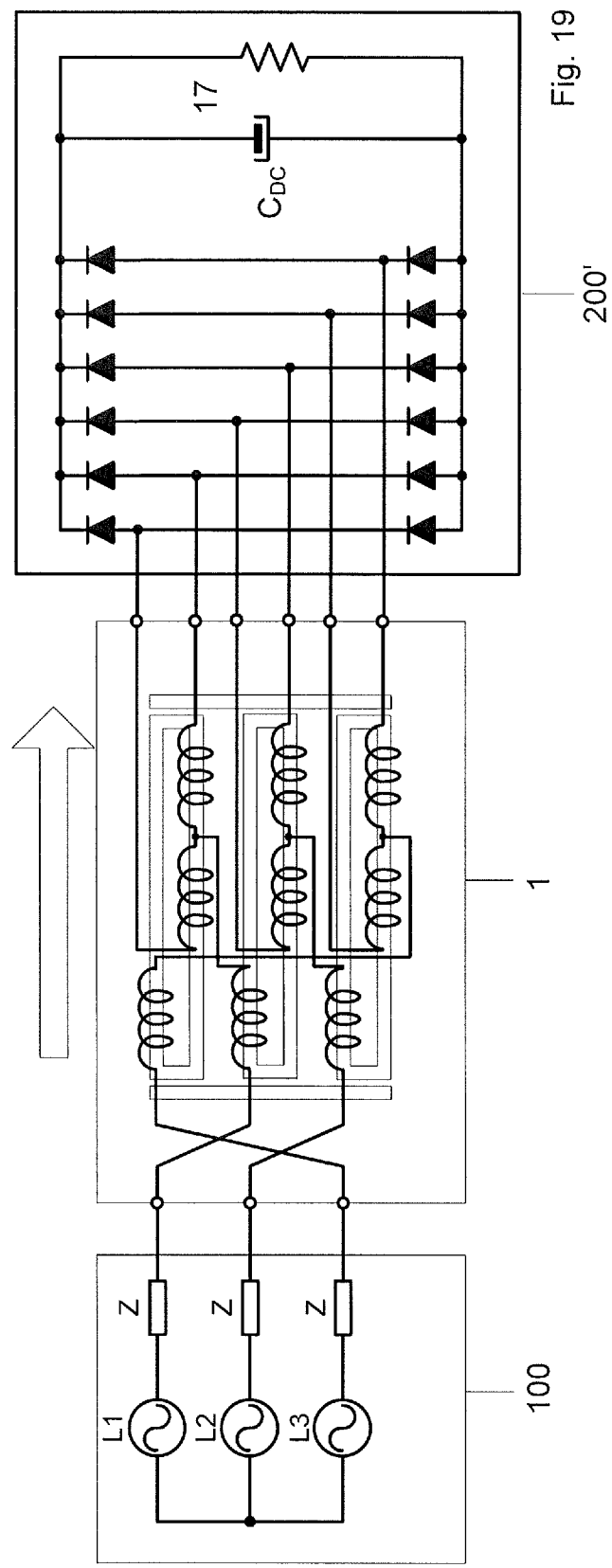
FIG. 19 shows a harmonics cancelling 12-pulse rectifier comprising an example of integrated magnetic device for low harmonics three-phase front-end according to the invention.

FIG. 19 illustrates an AC/DC power rectifier including a magnetic component or device 1 according to some embodiments of the invention. The DC link has a low impedance as schematically illustrated by the presence of the capacitor $C_{DC}$. Advantageously the device 1 can be also used in combination with a high impedance DC link.

Even if the DC link has a low impedance as schematically illustrated by the presence of the capacitor $C_{DC}$, in such a case an additional inductor 400 is not requested because, as described, the integrated device integrates also an inductor functions. Compared to the state of the art solution illustrated in FIG. 1A, in this case only one device, instead of four (inductor 400 and three magnetic devices 300), is used and one magnetic device comprising three magnetic sub-assemblies and two common yokes, instead of four magnetic devices, is used. The device 1 then allows to save material, cost and volume compared to the state of the art.

The device 1 has six outputs, because it splits each of the three common currents into two split currents. Six of these outputs are sent to 12-diodes rectifier. The outputs of these diodes are combined as shown in FIG. 19 to form a DC output. In this case the value of the phase difference between the two currents flowing in the split paths is equal to 30° and then $5^{th}$ and $7^{th}$, $17^{th}$ and $19^{th}$, $29^{th}$ and $31^{th}$ harmonics are cancelled.

Each magnetic sub-assembly 30 can be considered as belonging to a phase: in the example illustrated in FIG. 19 the first magnetic sub-assembly 30 can be considered as belonging to the phase of L1 because in the current outputs of this magnetic-sub assembly flows split current of L1.

As indicated by the arrow above the device 1 in FIG. 19 the power flow is unidirectional and in particular it goes from AC to DC.

As discussed, the device 1 can be used also as a merger in a DC/AC inverter. As described in such a case the device 1 works as a current merger. The DC/AC converter comprises a 12 or more pulse bridge of controlled switches in parallel to the 12 diodes. In one embodiment these active switches are transistors or Insulated Gate Bipolar Transistors (IGBTs). A driving circuit is arranged to change the status of the active switches.

When the device 1 is used in a DC/AC inverter, it merges each pair of split currents into a common current. In another embodiment the number of split currents to merge is nine or more.

The device 1 connected between the three phase power grid 100 and a 12-pulse rectifier produces a DC current of a predetermined direction and a DC voltage of a predetermined polarity. If SCR's are used instead of diodes in the 12-pulse rectifier, the DC voltage can change its value and polarity. The resultant phase controlled converter can work as an AC/DC rectifier or DC/AC inverter (two-quadrant converter).

Figure 20:
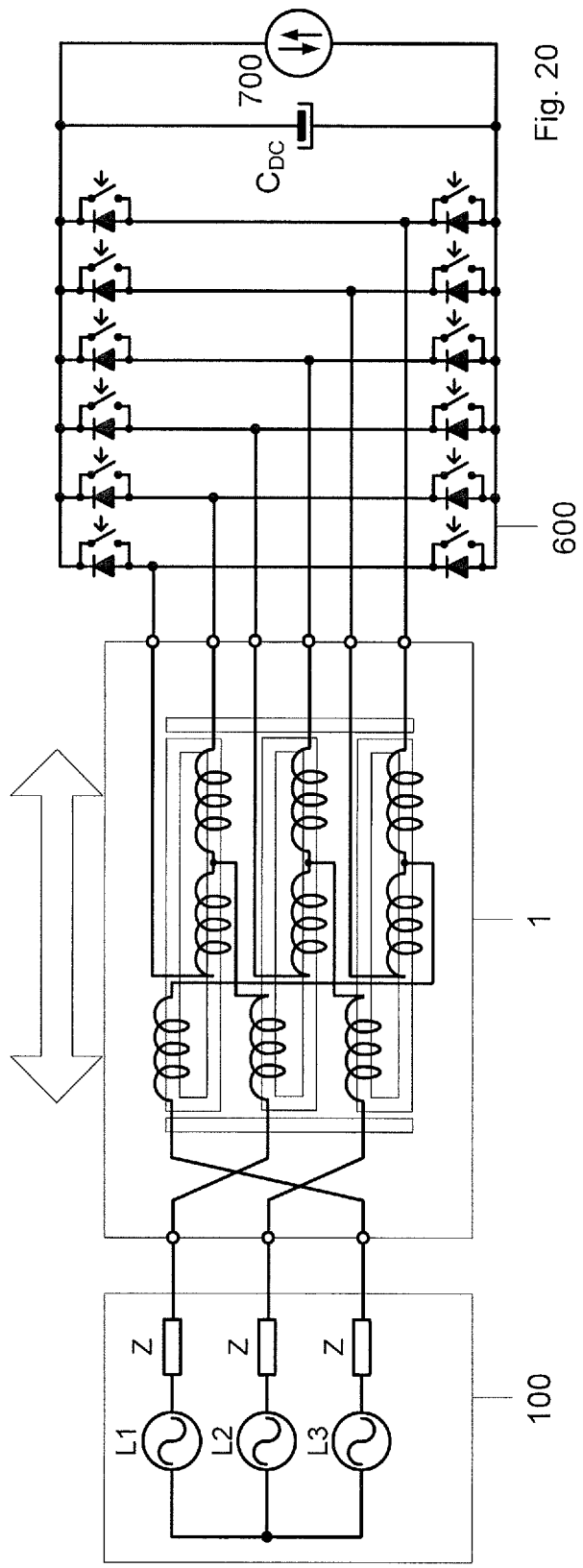
FIG. 20 shows a harmonics cancelling 12-pulse front-end with a bidirectional power flow comprising an example of integrated magnetic device for low harmonics three-phase front-end according to one aspect the invention.

According to an independent aspect of the invention, as indicated by the arrow above the device 1 in FIG. 20 the power flow between the AC and the DC part in a converter can be bidirectional. The reference 700 in fact indicates both power load and source. In such a case each of the diode of the 12-pulse rectifier has a controlled switch in parallel, to form a bidirectional front-end. The control circuit of these switches is not shown.

Such a bidirectional front-end power converter can be advantageously used for a motor of a train, an electric vehicle or a lift with a regenerative brake: some of kinetic energy of a vehicle and/or potential energy (due to elevation) can be converted into a useful form of energy instead of dissipating it as heat as with a conventional resistive brake and the converted energy can be fed back into a power grid for use by other vehicles.

The low harmonics bidirectional front-end power converter comprises
- a three-phase power line 100,
- an integrated magnetic device 1 as described,
- a set of 12 active or controlled switches with anti-parallel diodes,
- a DC link,
- a DC power source or a generic DC load 700.

The integrated magnetic device according to the invention can be advantageously used for battery charging or in combination with solar energy panels or in the public lighting context.

The advantages of using such an integrated device are:
- reducing harmonics,
- high reliability,
- low noise, i.e. low EMI,
- high efficiency.

The invention claimed is:

1. An integrated magnetic device for low harmonics three-phase front-end comprising
   - three magnetic sub-assemblies, wherein each magnetic sub-assembly comprises a close magnetic loop without air-gaps, two wound limbs and at least three windings,
   - at least one first common yoke and at least one second common yoke which magnetically connect said three magnetic sub-assemblies,
   - at least one air-gap between said three magnetic sub-assemblies and said at least one first common yoke or said at least one second common yoke,
   - three current inputs connectable to a three-phase power grid,
   - at least six current outputs, two for each current inputs, said current outputs being galvanically connected to said three current inputs and connectable to a load.

2. The integrated magnetic device of claim 1, wherein each of said three magnetic sub-assemblies comprises a first yoke and a second yoke and wherein said close magnetic loop without air-gaps comprises said two wound limbs, said first yoke and said second yoke.

3. The integrated magnetic device of claim 1, wherein each of said three magnetic sub-assemblies comprises two bobbins assembled on said close magnetic loop without air-gaps.

4. The integrated magnetic device of claim 1, wherein each of the said three magnetic sub-assemblies has identical limbs.

5. The integrated magnetic device of claim 1, wherein the sum of the magnetic fluxes entering into said first or second common yokes is zero.

6. The integrated magnetic device of claim 1, comprising two air-gaps, a first air-gap between said three magnetic sub-assemblies and said at least one first common yoke and a second air-gap between said three magnetic sub-assemblies and said at least one second common yoke.

7. The integrated magnetic device of claim 1, comprising one first common yoke and one second common yoke.

8. The integrated magnetic device of claim 7, wherein said first common yoke and said second common yoke have a triangular or circular or polygonal shape, wherein said three magnetic sub-assemblies are disposed in a triangular or circular or polygonal manner and wherein said device comprises a hole.

9. The integrated magnetic device of claim 1, wherein said first common yoke and said second common yoke have a rectangular shape, and wherein said three magnetic sub-assemblies are aligned.

10. The integrated magnetic device of claim 1, comprising two first common yokes and two second common yokes.

11. The integrated magnetic device of claim 10, comprising two holes.

12. The integrated magnetic device of claim 1, wherein said at least three windings comprise two split windings and one spreader winding.

13. The integrated magnetic device of claim 1, comprising four windings for each magnetic sub-assembly, said four windings comprising two split windings and two spreader windings.

14. The integrated magnetic device of claim 1, wherein when said device is connected between said three phase power grid and said load, each fundamental component of the common currents flowing in each of said current inputs is split into two split currents with a predefined phase angle flowing in each of said current outputs and wherein said each fundamental component of the common currents is shifted by a lagging angle from each of the voltage phasors of said three-phase power grid.

15. Use of the integrated magnetic device of claim 1 in an AC/DC rectifier including
    - a power grid,
    - a 12-pulse rectifier,
    - a DC link,
    - a generic DC load.

16. Use of the integrated magnetic device of claim 1 in a DC/AC inverter including 12-controlled switches.

17. A low harmonics bidirectional three-phase front-end power converter comprising
    - a three-phase power line,
    - the integrated magnetic device of claim 1,
    - a set of 12 controlled switches with anti-parallel diodes,
    - a DC link,
    - a DC power source or a generic DC load.

* * * * *